(12) United States Patent
Sato et al.

(10) Patent No.: US 11,243,410 B2
(45) Date of Patent: Feb. 8, 2022

(54) DISPLAY DEVICE

(71) Applicant: Tianma Japan, Ltd., Kanagawa (JP)

(72) Inventors: Tetsushi Sato, Kanagawa (JP);
Kazunori Masumura, Kanagawa (JP);
Koji Shigemura, Kanagawa (JP)

(73) Assignees: WUHAN TIANMA MICRO-ELECTRONICS CO., LTD., Wuhan (CN); TIANMA JAPAN, LTD., Kanagawa (JP)

( * ) Notice: Subject to any disclaimer, the term of this patent is extended or adjusted under 35 U.S.C. 154(b) by 0 days.

(21) Appl. No.: 16/857,433

(22) Filed: Apr. 24, 2020

(65) Prior Publication Data

US 2020/0341292 A1 Oct. 29, 2020

(30) Foreign Application Priority Data

Apr. 26, 2019 (JP) .............................. JP2019-086017
Dec. 27, 2019 (JP) .............................. JP2019-238526

(51) Int. Cl.
*G02B 30/27* (2020.01)
*H04N 13/363* (2018.01)
(Continued)

(52) U.S. Cl.
CPC ........... *G02B 30/27* (2020.01); *G03B 21/606* (2013.01); *G03B 35/24* (2013.01); *H04N 13/363* (2018.05)

(58) Field of Classification Search
CPC .. G03B 21/606; G03B 35/24; G02B 27/2221; G02B 27/2214; G02B 30/27; H04N 13/0404; H04N 13/363
(Continued)

(56) References Cited

U.S. PATENT DOCUMENTS 5,315,377 A * 5/1994 Isono .................. H04N 13/361
348/51
8,503,079 B2 * 8/2013 Lin ..................... G02B 27/0018
359/464
(Continued)

FOREIGN PATENT DOCUMENTS

JP        2004-280052       10/2004
JP        2005010755    *   1/2005    ............. G02B 27/22
(Continued)

*Primary Examiner* — Clayton E. LaBalle
*Assistant Examiner* — Kevin C Butler
(74) *Attorney, Agent, or Firm* — Nixon & Vanderhye

(57) ABSTRACT

A display device comprises a projection device projecting a display image, an aerial imaging element, and a distribution mechanism in which distribution units are arranged at a given interval. An interval between the distribution units is determined according to a relationship between a number of view point pixels constituting a pixel unit, a number of pixel units, a distance from the pixel unit at a center to the pixel unit at an edge, a distance from a distribution unit at a center to the distribution unit at an edge, a pitch of the view point pixel, an angle of light from the pixel unit at the center emitted to the distribution unit, and an angle of the emitted light, an angle of light from the pixel unit at the edge emitted to the distribution unit, and an angle of the emitted light, a distance between the projection device and the distribution units, a refractive index of the distribution mechanism, a distance between the real image and an optimal viewing position for a viewer, and a projection width.

13 Claims, 32 Drawing Sheets

(51) Int. Cl.
 *G03B 21/606* (2014.01)
 *G03B 35/24* (2021.01)
(58) Field of Classification Search
 USPC .......................................................... 359/458
 See application file for complete search history.

(56) References Cited

U.S. PATENT DOCUMENTS

| | | | | |
|---|---|---|---|---|
| 2002/0021492 A1* | 2/2002 | Morishima | ............ | H04N 13/349 359/463 |
| 2002/0044349 A1* | 4/2002 | Shinoura | ................ | G03B 21/56 359/443 |
| 2004/0085643 A1* | 5/2004 | Ishikawa | .............. | G02B 3/0062 359/619 |
| 2004/0169919 A1* | 9/2004 | Uehara | .................. | G02B 30/27 359/443 |
| 2004/0263964 A1* | 12/2004 | Okano | ................... | G03B 35/24 359/443 |
| 2007/0109505 A1* | 5/2007 | Kubara | .................. | G03B 21/10 353/69 |
| 2007/0159525 A1* | 7/2007 | Tomisawa | .............. | G02B 30/27 348/51 |
| 2008/0211976 A1* | 9/2008 | Nam | ....................... | G09G 3/003 349/15 |
| 2010/0123952 A1* | 5/2010 | Chen | ...................... | G02B 30/27 359/464 |
| 2010/0128271 A1* | 5/2010 | Maekawa | ............... | G02B 30/00 356/435 |
| 2011/0304601 A1* | 12/2011 | Niioka | ................... | G02B 30/27 345/209 |
| 2011/0316985 A1* | 12/2011 | Ishikawa | .............. | H04N 13/117 348/51 |
| 2012/0092763 A1* | 4/2012 | Song | ..................... | H04N 13/305 359/463 |
| 2012/0182292 A1* | 7/2012 | Shimoyama | ........ | G02B 27/0093 345/419 |
| 2013/0242386 A1* | 9/2013 | Koi | ........................ | H04N 13/31 359/464 |
| 2014/0009579 A1* | 1/2014 | Sumi | ..................... | H04N 13/327 348/46 |
| 2014/0211308 A1* | 7/2014 | Shin | ....................... | G02B 30/27 359/463 |
| 2014/0232837 A1* | 8/2014 | Kim | ....................... | H04N 13/31 348/59 |
| 2015/0109549 A1* | 4/2015 | Gong | ................... | H04N 13/317 349/15 |
| 2015/0192780 A1* | 7/2015 | Guo | ........................ | H04N 13/31 359/462 |
| 2015/0268479 A1* | 9/2015 | Woodgate | ............ | G02B 6/0035 349/15 |
| 2015/0286062 A1* | 10/2015 | Zheng | ................... | G02B 30/27 349/57 |
| 2016/0219260 A1 | 7/2016 | Sato et al. | | |
| 2016/0260371 A1* | 9/2016 | Wang | ................... | G09G 3/003 |
| 2016/0370595 A1* | 12/2016 | Sumi | ..................... | G02B 30/27 |
| 2017/0208320 A1* | 7/2017 | Suzuki | .................. | H04N 13/31 |
| 2020/0341292 A1* | 10/2020 | Sato | ..................... | H04N 13/302 |

FOREIGN PATENT DOCUMENTS

| | | |
|---|---|---|
| JP | 2016-140056 | 8/2016 |
| JP | 2017-010014 | 1/2017 |
| WO | WO 2008/123473 | 10/2008 |

\* cited by examiner direction# DISPLAY DEVICE

CROSS-REFERENCE TO RELATED APPLICATIONS

This Non-provisional application claims priority under 35 U.S.C. § 119(a) on Patent Application No. 2019-86017 filed in Japan on Apr. 26, 2019, and Patent Application No. 2019-238526 filed in Japan on Dec. 27, 2019, the entire content of which is hereby incorporated by reference.

BACKGROUND

The present disclosure relates to a display device that projects a 3-dimensional image in midair.

There are image forming means that can define a given plane and an image of a subject on one side of the plane is formed, in midair on the other surface side, as a real image in which the protrusion/recess relationship is inverted, and in this specification, such an image forming means is referred to as an aerial imaging element. Well-known examples of such aerial imaging elements include a dihedral corner reflector, a device combines a retroreflector array and a half mirror, and afocal lens arrays in which two microlens arrays are used to form the lens pairs into an afocal system (see, for example WO 2008/123473).

Also, well-known examples of 3-dimensional displays that project a 3-dimensional image include displays that employ the lenticular lens method, the parallax barrier method, or the like (see, for example, JP 2004-280052 A).

Additionally, an image display device that, with the combination of the aerial imaging element with the 3-dimensional display, projects 3-dimensional image in midair is a well-known example (see, for example JP 2016-140056 A, JP 2017-10014 A).

SUMMARY OF THE INVENTION

An aspect of this disclosure is a display device, comprising: a projection device that projects a display image including a plurality of view point images with differing view points; an aerial imaging element that projects the display image as a real image in midair; and a distribution mechanism in which a plurality of distribution units that distribute light from the display image are arranged at a given interval so as to form view point image viewing regions of the plurality of view point images. Each of the plurality of distribution units is arranged so as to correspond to each pixel unit constituted of a plurality of view point pixels that display the plurality of view point images. An interval (Sp) between the plurality of distribution units is determined according to a relationship between a number (N) of the plurality of view point pixels constituting the pixel unit, a number (m) of a plurality of pixel units from a center of the projection device to an edge of the projection device, a distance (WP) from the pixel unit at the center of the projection device to the pixel unit at the edge of the projection device, a distance (WS) from one of the plurality of distribution units corresponding to the pixel unit at the center of the projection device to one of the plurality of distribution units corresponding to the pixel unit at the edge of the projection device, a pitch (P) of one of the plurality of view point pixels included in the pixel unit, an angle (α) of light from the pixel unit at the center of the projection device emitted to one of the plurality of distribution units, and an angle (β) of the light emitted from the one of the plurality of distribution units, an angle (γ) of light from the pixel unit at the edge of the projection device emitted to one of the plurality of distribution units, and an angle (δ) of the light emitted from the one of the plurality of distribution units, a distance (h) between the projection device and the plurality of distribution units, a refractive index (n) of the distribution mechanism, a distance (OD) between the real image and an optimal viewing position for a viewer, and a projection width (e) that is half of the pitch of the pixel unit at the distance (OD) from the real image.

It is to be understood that both the foregoing general description and the following detailed description are exemplary and explanatory and are not restrictive of this disclosure.

DETAILED DESCRIPTION OF EMBODIMENTS

Figure 1:
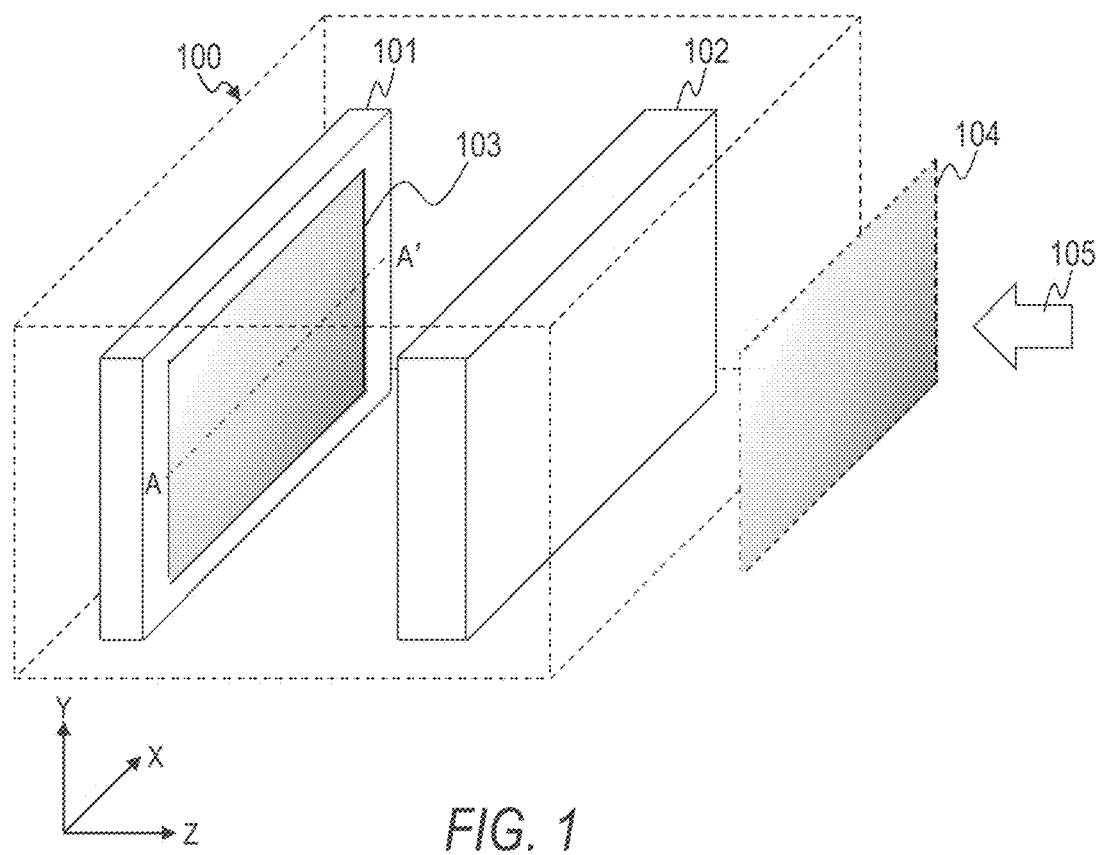
FIG. 1 is a schematic view of a configuration example of an image display device according to the present disclosure.

Below, embodiments of the present invention will be explained with reference to figures. In each of the figures, common components are given the same reference characters.

Embodiment 1

Figure 2:
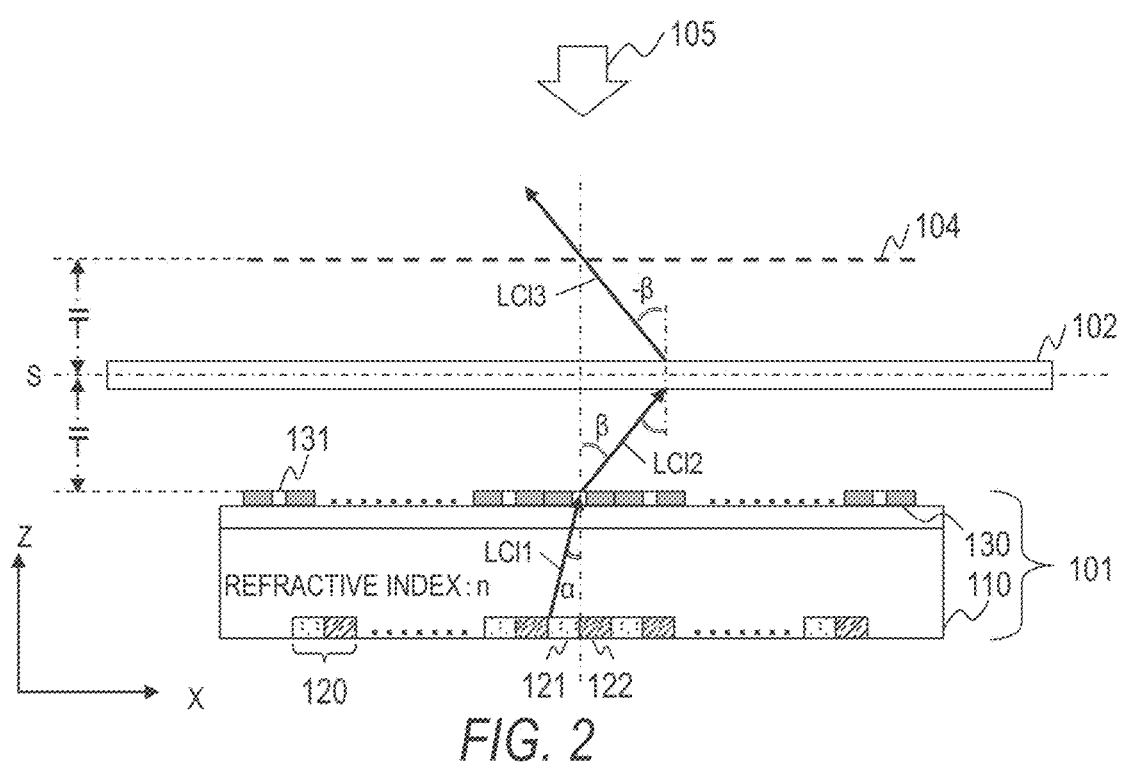
FIG. 2 is a schematic view of an optical model of the image display device of the present disclosure.

FIG. 1 is a schematic view of a configuration example of an image display device 100 according to the present disclosure. FIG. 2 is a schematic view of an optical model of the image display device 100 of the present disclosure.

FIG. 1 is a perspective view of the image display device 100 according to Embodiment 1. FIG. 2 is a view of the cross-sectional structure along the line A-A' on the XZ plane of the image display device 100 and an optical model.

For ease of description, the image display device 100 will be described using coordinate axes such as those illustrated in FIG. 1. Also, for ease of description, the coordinate axes are set so as to be perpendicular or parallel to the components of the image display device 100.

The image display device 100 is a device that projects a 3-dimensional subject (image) in midair, and has a 3-dimensional display 101 and an aerial imaging element 102. An aerial image 104 indicates a screen 103 of the 3-dimensional display 101 of which an image is to be formed in midair by the aerial imaging element 102. In the present disclosure, the eyes of a viewer are aligned along the X direction, and the viewer would view the aerial image 104 from the direction of the arrow 105.

The 3-dimensional display 101 and the aerial imaging element 102 are accommodated in a case. The case of the image display device 100 that accommodates the 3-dimensional display 101 and the aerial imaging element 102 may be of any shape.

The 3-dimensional display 101 includes a display panel provided with a plurality of pixels for forming a plurality of view point images, and an optical separation means for separating light emitted from the pixels corresponding, respectively, to the view point images, for each view point in space. The 3-dimensional display 101 of the present disclosure is, as will be described later, designed such that a floating image formed by the aerial imaging element can be perceived as a 3-dimensional image by the viewer, in terms of the design of the optical separation means for the prescribed display panel. Thus, if the viewer were to directly view the screen of the 3-dimensional display 101 of the present disclosure without an aerial imaging element present therebetween, normal view regions and reverse view regions would appear alternately in the image, which would prevent the viewer from viewing a suitable 3-dimensional image. However, for ease of description, in the present specification, a display panel including this optical separation means is referred to as a "3-dimensional display".

The 3-dimensional display 101 of Embodiment 1 is a 3-dimensional display 101 that uses a parallax barrier as the optical separation means. The 3-dimensional display 101 has the display panel 110 and a parallax barrier 130.

The display panel 110 is a liquid crystal panel, an LED panel, an OLED panel, or the like, and displays a display image including a figure with differing view points (view point image). The display panel 110 is constituted of a plurality of pixel units 120 that display pixels of the display image.

The pixel units 120 are constituted of a plurality of view point pixels (view point pixel group) that display pixels of the view point images. As illustrated in FIG. 2, for example, the pixel units 120 of the display panel 110 are constituted of two view point pixels 121 and 122 that are arranged alternately in the X direction. The view point pixel 121 displays a pixel of a left eye perspective view point image, and the view point pixel 122 displays a pixel of a right eye perspective view point image. Thus, in this case, the display panel 110 displays a display image including two view point images.

In the present embodiment, the display panel 110, which displays a display image including two view point images, will be described as an example, but the display panel 110 may display a display image including three or more view point images. In such a case, the pixel units 120 are constituted of a view point pixel group that display pixels of a plurality of view point images.

Figure 3:
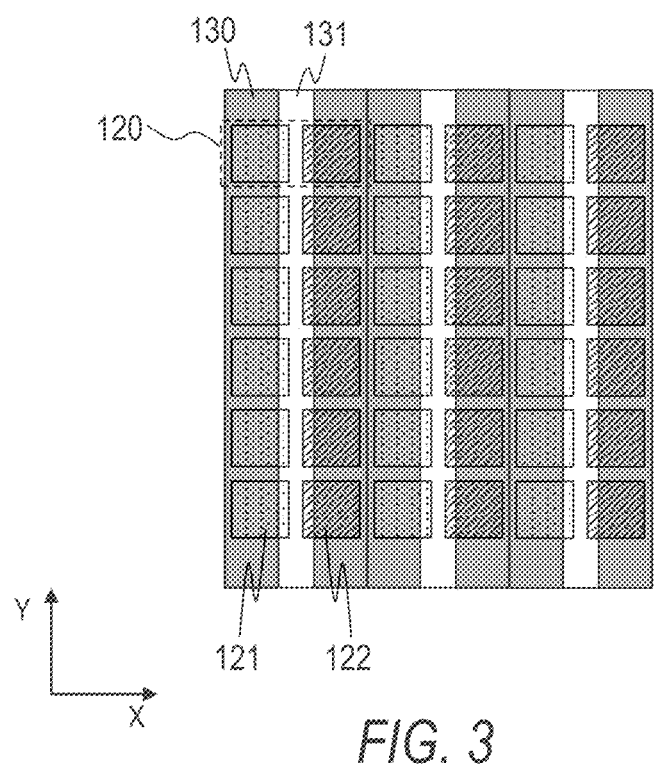
FIG. 3 is a schematic view (XY plan view) for describing a parallax barrier included in a 3-dimensional display of the present disclosure.

The parallax barrier 130 is a light-shielding barrier, and has slits 131 that are arranged in a given pattern. FIG. 3 is a schematic view (XY plan view) for describing the parallax barrier 130 in the center of the 3-dimensional display 101 of the present disclosure. The angle of the light beams passing through the slits from the view point pixels via the barriers is restricted. Thus, by suitably arranging the parallax barrier 130 on the display panel 110, regions where only the view point pixels 121 (view point pixel group) of the pixel units 120 are visible through the slits 131 and regions where only the view point pixels 122 (view point pixel group) of the pixel units 120 are visible through the slits 131 are formed.

In other words, the parallax barrier 130 provided with the slits 131 functions as an optical separation means (division unit) that divides a group of light beams emitted from the display image displayed in the display panel 110 into light beam groups for each view point image. The slits 131 are arranged such that each slit 131 corresponds to one pixel unit 120.

The parallax barrier 130 may, for example, be a switchable liquid crystal parallax barrier in which the light-shielding portion can be electrically made transparent. In such a case, by the light-shielding portion becoming transparent, in addition to 3-dimensional images, 2-dimensional images can be displayed.

Also, as illustrated in FIG. 2, the inside of the 3-dimensional display 101 has a refractive index n differing from that of air, and thus, the light beams passing from the view point pixels 121 and 122 through the slits 131 refract at the air boundary. A light beam that exits from the left end of the pixel unit 120 located in the center of the display panel 110 and passes through the slit 131 located in the center of the parallax barrier 130 is referred to as a light beam LCl1, and where the incident angle of the light beam LCl1 is an incident angle α, the light beam LCl1 passing through the slit 131 at the incident angle α refracts at the air boundary, and progresses towards the aerial imaging element 102 as a light beam LCl2 with an emission angle β. Here, the image display device 100 of the present disclosure is designed such that a normal line vector of the display surface of the display panel 110 projected on the XZ plane overlaps the normal line vector of a plane S of the aerial imaging element 102 projected on the XZ plane. Thus, the light beam LCl2 enters the aerial imaging element 102 with an incident angle β, and due to characteristics of the aerial imaging element 102 that will be described in detail later, this light beam is emitted as a light beam LCl3 with an emission angle of −β. An angle in the clockwise direction is defined here as a positive angle.

The aerial imaging element 102 is an image forming means that causes light from a subject inputted from one surface side to be reflected or refracted, and forms an image of the subject in midair on the other surface side as a real image in which the protrusion/recess relationship is inverted. Thus, as a result of another light beam group passing along a similar path to the light beam LCl3, an image of the screen of the 3-dimensional display 101 is formed as a real image (aerial image 104) at a position in planar symmetry about the plane S of the aerial imaging element 102. The aerial imaging element 102 illustrated in FIG. 2 does not represent a specific shape, size, or position, and instead, represents a conceptual shape, size, and position.

An afocal lens array, a mirror element array that causes reflection to occur twice, and an optical system combining a retroreflective sheet and a half mirror can be used as the aerial imaging element 102, for example. Here, the above aerial imaging element 102 will be described.

Figure 4A:
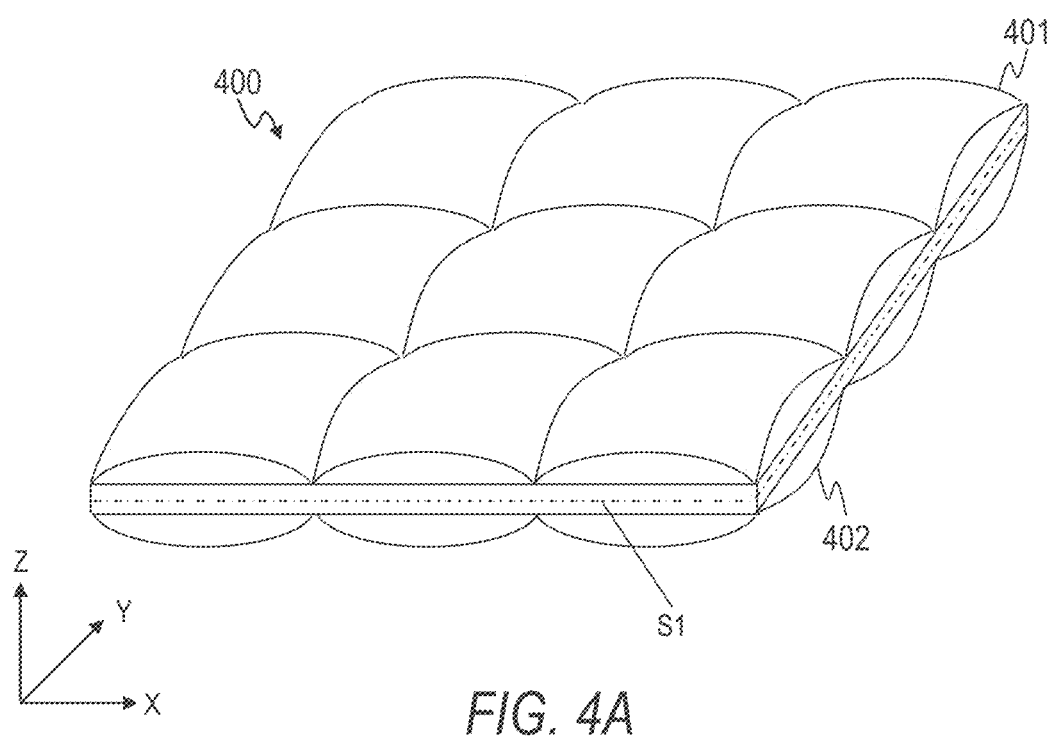
FIGS. 4A and 4B are perspective views for describing examples of a structure of an afocal lens array functioning as an aerial imaging element of the present disclosure.
Figure 4B:
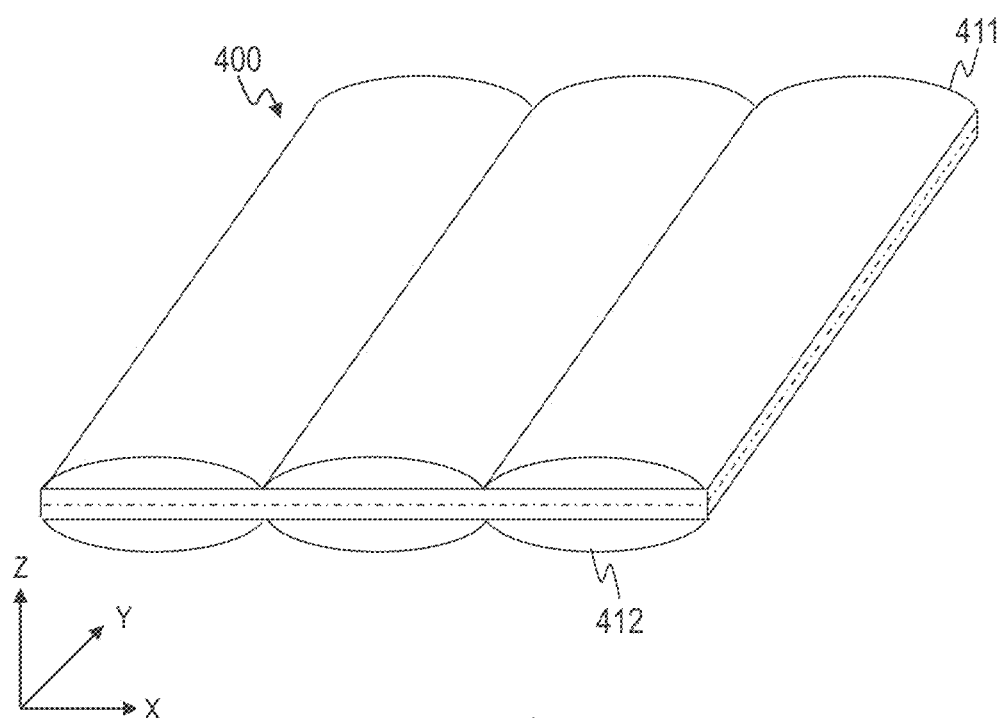

First, the afocal lens array will be described. FIGS. 4A and 4B are perspective views for describing examples of a structure of an afocal lens array 400 functioning as the aerial imaging element 102 of the present disclosure.

The afocal lens array 400 illustrated in FIG. 4A is a structure in which lens arrays 401 and 402, in which element lenses are arranged on a plane, are combined to form a pair, and each element lens of each array surface forms a pair with an element lens on the opposite surface. Also, the pairs of element lenses are arranged such that the optical axes thereof are the same, and the focal points of the element lenses of the lens arrays 401 and 402 are designed so as to match within the afocal lens array 400. The plane formed by the group of focal points is S1.

An array that has a lens effect in two directions is suitable as a configuration of the afocal lens array 400, but so-called lenticular lenses that are arrays 411 and 412 of cylindrical lenses that are formed in one direction as illustrated in FIG. 4B can also be used.

Figure 5A:
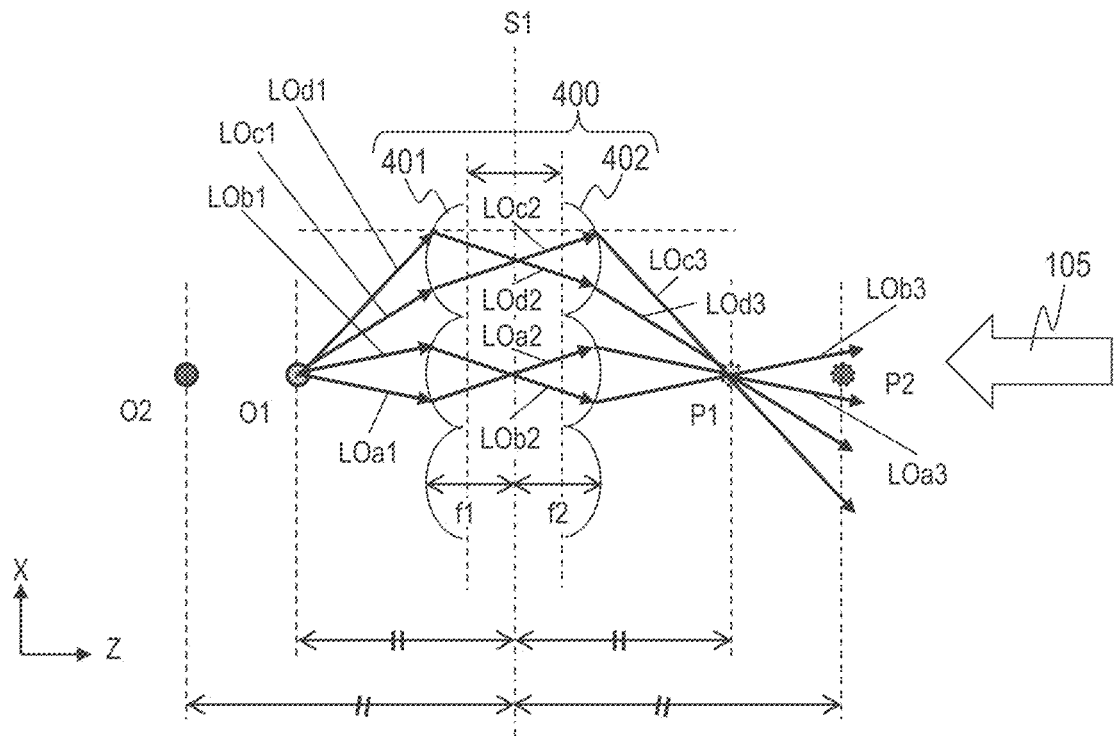
FIGS. 5A and 5B are views for describing operational principles of the afocal lens array.
Figure 5B:
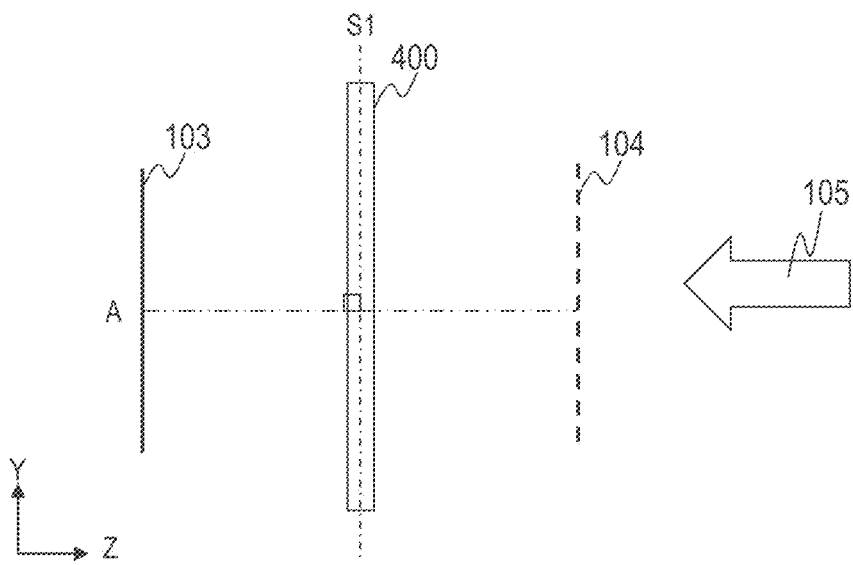

FIGS. 5A and 5B are views for describing operational principles of the afocal lens array 400.

The element lenses of the lens arrays 401 and 402 illustrated in FIG. 5A are designed such that the focal lengths are equal (f1=f2), and thus, the plane S1 is a central plane in the Z axis direction of the afocal lens array 400. Light beams LOa1, LOb1, LOc1, and LOd1 emitted from a light source O1 enter the lens array 401. The light beams LOa1 and LOb1 and the light beams LOc1 and LOd1 entering the element lenses can be considered to be parallel light if the distance from the element lens surface to O1 is sufficiently long in relation to the pitch of the element lenses. Thus, the light beams LOa2 and LOb2 and the light beams LOc2 and LOd2 that entered and were refracted by the lens array 401 intersect with the plane S1, are refracted by the lens array 402, and are emitted as the light beams LOa3, LOb3, LOc3, and LOd3. Where f1=f2, the incident angle and the emission angle of each light beam are equal, and thus, the light beams LOa3, LOb3, LOc3, and LOd3 gather at a position P1 that is in planar symmetry with the light source O1 about the plane S1. Thus, an image of the light source O1 is formed as a real image at the position P1. Similarly, a light source O2 at a position further away from the plane S1 than the light source O1 forms an image at a position P2.

As illustrated in FIG. 5A, a viewer perceives the image at the position P2 to be closer than the image at the position P1. Thus, if a 3-dimensional subject is arranged instead of the light sources O1 and O2, a real image in which the protrusion/recess relationship of the subject is inverted is formed in midair at a position in planar symmetry about the plane S1.

As described above, the afocal lens array 400 functions as the aerial imaging element 102, which causes a subject inputted from one surface side to be reflected so as to be formed as an image in midair on the other surface side, with respect to the plane S1, as a real image in which the protrusion/recess relationship is inverted. The relationship between the incident light beam and the emitted light beam of the light beam forming the image is one in which the magnitude of the incident angle and the emission angle in relation to the normal line of the plane S is the same, but the signs differ.

Thus, if the screen 103 and the afocal lens array 400 are arranged as illustrated in FIG. 5B, an image of the screen 103 is formed as a real image at a position in planar symmetry about the plane S1. The viewer can see the formed aerial image 104 from the direction of the arrow 105.

Figure 6A:
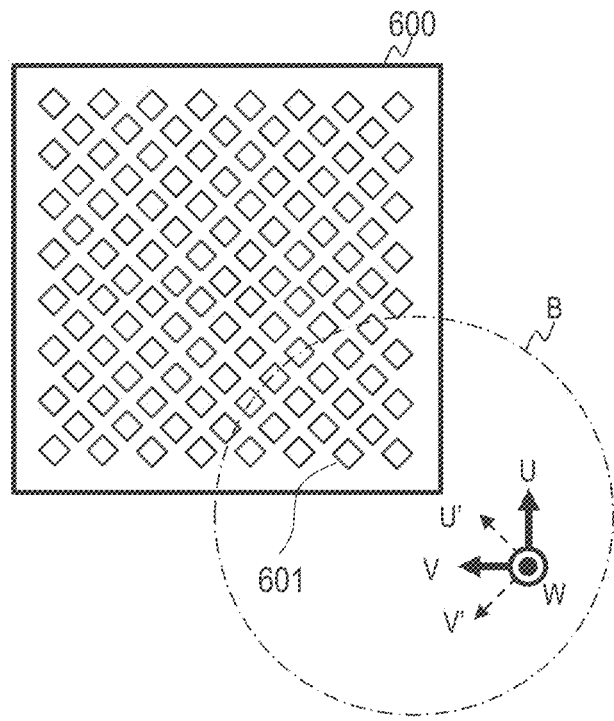
FIGS. 6A and 6B are views for schematically describing examples of a structure of a mirror element array functioning as the aerial imaging element of the present disclosure.
Figure 6B:
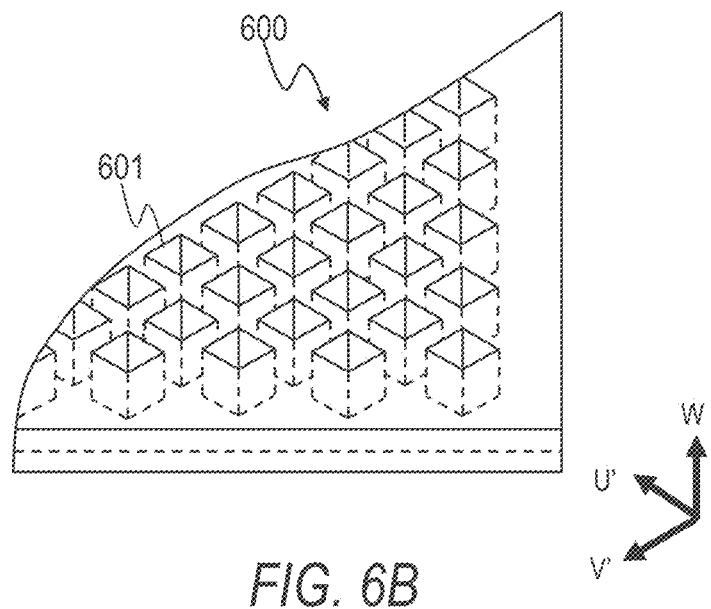

Next, the mirror element array will be described. FIGS. 6A and 6B are views for schematically describing examples of a structure of a mirror element array 600 functioning as the aerial imaging element 102 of the present disclosure. FIG. 6A is a plan view of the mirror element array 600 along the UV plane in a UVW coordinate system, and FIG. 6B is a partial expanded perspective view of a region B of the mirror element array 600.

As illustrated in FIG. 6A, the mirror element array 600 has a planar spread in the U axis direction and the V axis direction. The plane is provided with multiple unit optical elements 601 having a diamond shape that allow through light from one surface to another surface (or from the other surface to the one surface.

Here, in order to describe the partial expanded perspective view of the region B of FIG. 6B, a 3-dimensional Cartesian coordinate system UVW is set. The 3-dimensional Cartesian coordinate system UVW is a coordinate system in which the U axis and the V axis are rotated 45 degrees about the W axis, and the UV' plane is parallel to the UV plane.

As illustrated in FIG. 6B, the thickness direction of the mirror element array 600 is the W axis direction. The unit optical elements 601 are arranged in a matrix along the U' axis direction and the V' axis direction. In each unit optical element 601, inner wall surfaces that are perpendicular to each other are formed in the W axis direction, and each of the inner wall surfaces is subjected to a mirroring process.

Figure 7A:
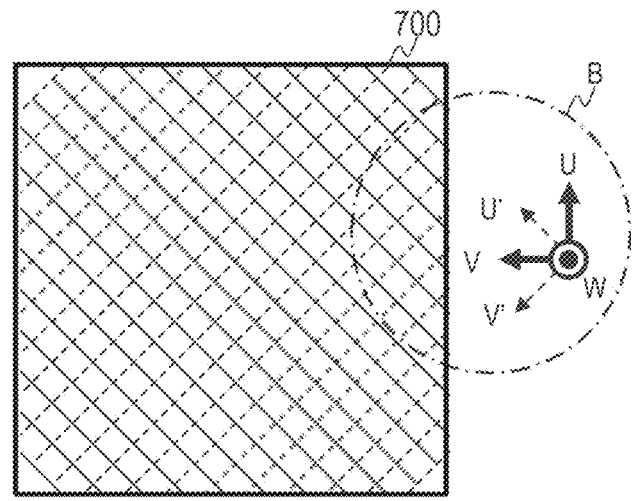
FIGS. 7A and 7B are views for describing examples of a structure of another mirror element array functioning as the aerial imaging element of the present disclosure.
Figure 7B:
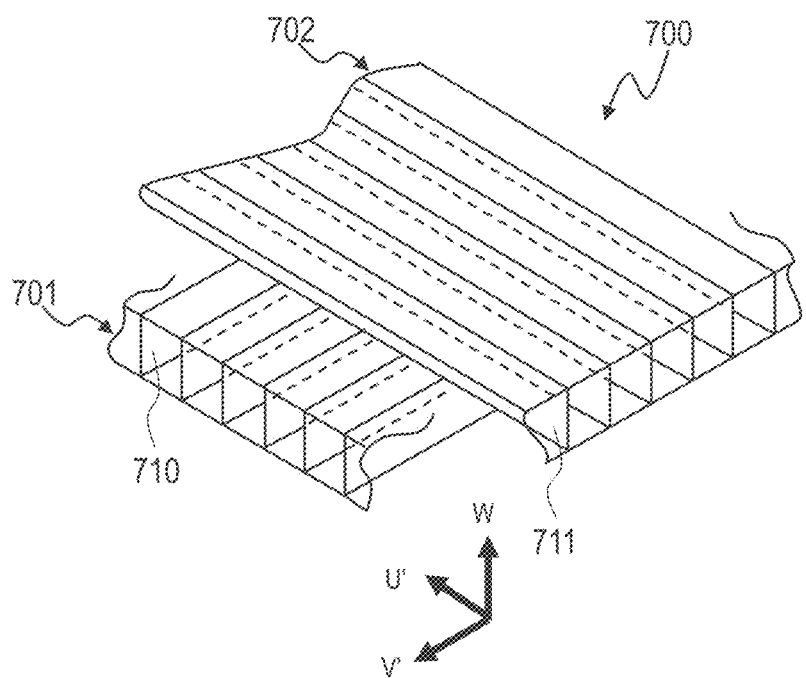

FIGS. 7A and 7B are views for describing examples of a structure of another mirror element array 700 functioning as the aerial imaging element 102 of the present disclosure. FIG. 7A is a UV plan view of the mirror element array 700, and FIG. 7B is a partial expanded perspective view of a region B of the mirror element array 700.

As illustrated in FIG. 7A, the mirror element array 700, similar to the mirror element array 600, has a planar spread in the U axis direction and the V axis direction. In order to describe the expanded perspective view of the region B, a 3-dimensional Cartesian coordinate system UVW is set, similar to FIG. 6A.

As illustrated in FIG. 7B, the mirror element array 700 has a structure in which a first element 701 having mirror surfaces 710 that are parallel to the V'W plane, and a second element 702 having mirror surfaces parallel to the U'W plane are close together in the W axis plane. The first element 701 or the second element 702 is a structure in which a plurality of pieces of transparent glass (or acrylic resin), the side surfaces of which are mirror surfaces, are close together at a uniform interval in the U' axis or V' axis direction. Thus, as illustrated in FIG. 7A, the mirror element array 700 has a structure in which multiple diamond-shaped unit optical elements that allow through light from one surface to the other are formed in the W axis direction.

Figure 8:
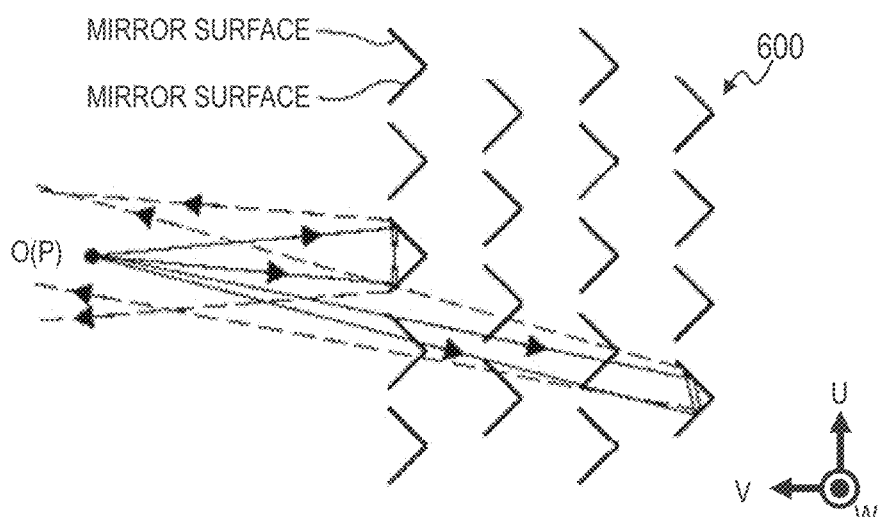
FIGS. 8, 9A, and 9B are views for describing operational principles of the mirror element array.
Figure 9A:
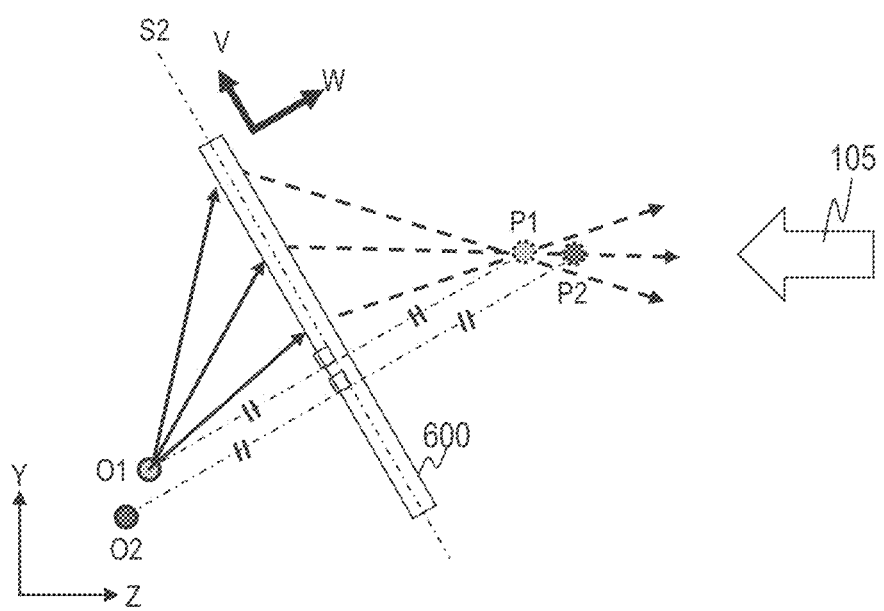
Figure 9B:
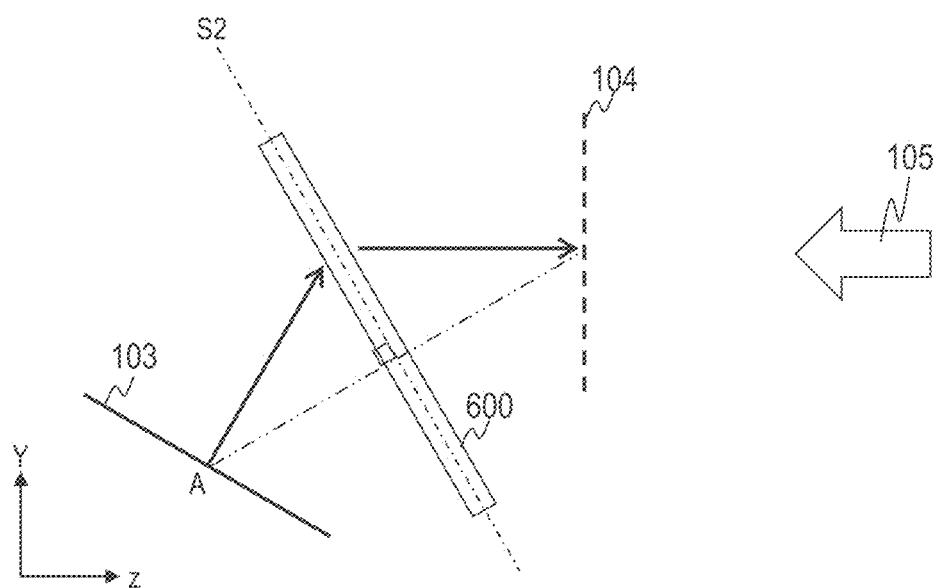

FIGS. 8, 9A, and 9B are views for describing operational principles of the mirror element arrays 600 and 700. Here, the description of the operational principles will use the mirror element array 600 as an example, but the operational principles are similar for the mirror element array 700 as well.

FIG. 8 schematically illustrates an optical path of light being emitted from a light source O and forming an image at a position P when the mirror element array 600 is viewed from the W axis direction. The solid lines represent light emitted from the light source and the dotted lines represent light reflected off of the mirror surface. FIG. 9 illustrates a view from the U axis direction and the mirror element array 600 is arranged such that the W axis thereof is inclined with respect to the Y axis. A plane that is formed in the V axis direction of the mirror element array 600, and that is positioned in the center of thickness in the W axis direction of the mirror element array 600 is a plane S2.

As illustrated in FIG. 8, the light emitted from the light source O enters the mirror element array 600. When the incident light is reflected off of two perpendicular mirror surfaces formed on the mirror element array 600, the light progresses in the directions of the arrows indicated with dotted lines.

In FIG. 8, for ease of description, the shape of the aerial imaging element 102 is represented schematically, and the actual interval between perpendicular mirror elements is designed so as to be sufficiently smaller than the distance from the light source to the aerial imaging element 102. Thus, when viewing the optical path of light reflected twice in the mirror element array 600 from the W axis direction, the incident light and the emitted light substantially overlap. Thus, as illustrated in FIG. 9A, among the light emitted from a light source O1, light that has been reflected twice by the mirror surfaces in the mirror element array 600 gathers at the position P, which is in planar symmetry with the light source O with respect to the plane S2. Thus, an image of the light source O1 is formed as a real image at the position P1. Similarly, a light source O2 at a position farther away from the plane S2 than the light source O1 forms an image at a position P2.

As illustrated in FIG. 9A, a viewer perceives the image at the position P2 to be closer than the image at the position P1. Thus, if a 3-dimensional subject is arranged instead of the light sources O1 and O2, a real image in which the protrusion/recess relationship of the subject is inverted is formed in midair at a position in planar symmetry about the plane S2.

As described above, the mirror element array 600 functions as the aerial imaging element 102, which causes a subject inputted from one surface side to be reflected so as to be formed as an image in midair on the other surface side, with respect to the plane S2, as a real image in which the protrusion/recess relationship is inverted. The relationship between the incident light beam and the emitted light beam of the light beam forming the image is one in which the magnitude of the incident angle and the emission angle in relation to the normal line of the plane S2 is the same, but the signs differ.

Thus, if the screen 103 and the mirror element array 600 are arranged as illustrated in FIG. 9B, an image of the screen 103 is formed as a real image at a position in planar symmetry about the plane S2. The viewer can see the formed aerial image 104 from the direction of the arrow 105.

Figure 10A:
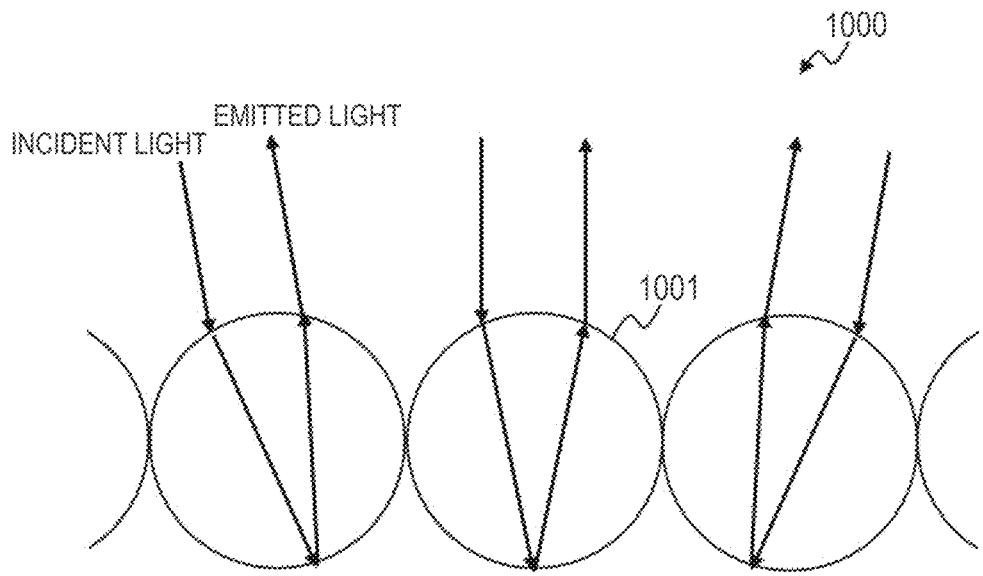
FIGS. 10A and 10B are views for describing operational principles of a retroreflective sheet.
Figure 10B:
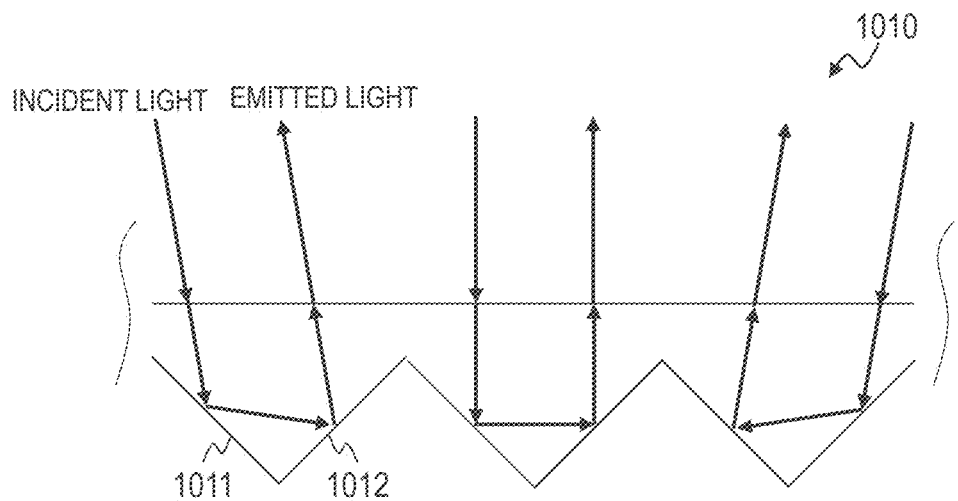

Next, an optical system in which a retroreflective sheet and a half mirror is combined will be described. First, the retroreflective sheet will be described. FIGS. 10A and 10B are views for describing operational principles of the retroreflective sheet.

The retroreflective sheet is designed such that the incident angle of light entering the sheet surface is, in principle, equal to the emission angle of light reflected off of the reflective surface inside the sheet and emitted from the sheet surface.

FIG. 10A is a side view for describing an example of the structure of a retroreflective sheet 1000. The retroreflective sheet 1000 has a structure in which a plurality of glass bead spheres 1001 are arranged. The light entering the sphere 1001 is refracted at the surface, reflected inside the sphere, refracted again at the surface, and emitted from the sphere 1001. The incident surface and the reflective surface are spherical surfaces, and thus, the incident angle and the emission angle are equal. Thus, the sheet having the structure illustrated in FIG. 10A functions as a retroreflective sheet that reflects light towards the incident direction of the light.

FIG. 10B is a side view for describing an example of the structure of another retroreflective sheet 1010. The retroreflective sheet 1010 has a structure in which a plurality of triangular pyramid or rectangular pyramid bottom surfaces (reflective surfaces 1011 and 1012) are arranged in the direction in which light enters. The internal angle formed by the reflective surfaces 1011 and 1012 illustrated in the side view of FIG. 10B is set to 90 degrees, and thus, when incident light is reflected off of each of the reflective surfaces 1011 and 1012, the light moves towards the same direction from which the light originally came.

Figure 11A:
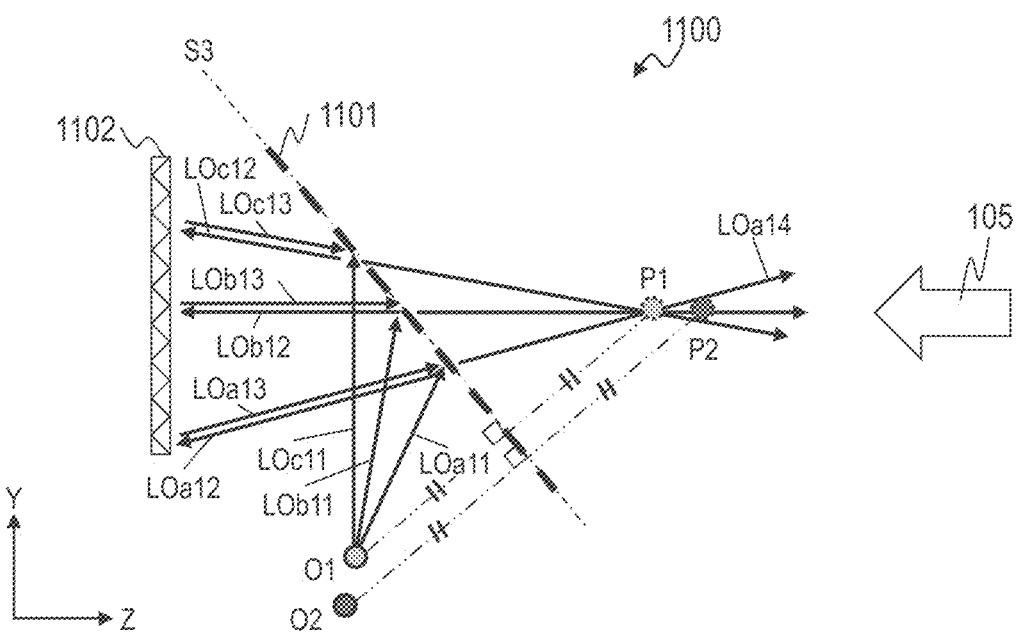
FIGS. 11A and 11B are views for describing operational principles of an optical system in which a half mirror is combined with a retroreflective sheet.
Figure 11B:
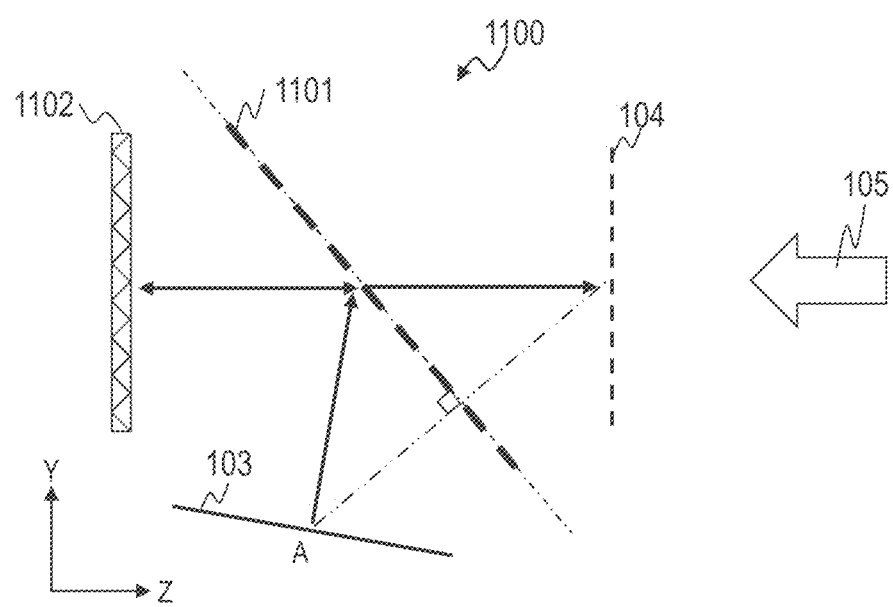

FIGS. 11A and 11B are views for describing operational principles of an optical system 1100 in which half mirrors 1101 are combined with a retroreflective sheet 1102.

Light beams LOa11, LOb11, and LOc11 from the light source O1 are passed through or reflected by the half mirrors 1101. The light beams LOa12, LOb12, and LOc12 reflected by the half mirrors 1101 are retroreflected by the retroreflective sheet 1102, and are again passed through or reflected by the half mirrors 1101 as the light beams LOa13, LOb13, and LOc13. The light beams LOa13, LOb13, and LOc13 passing through the half mirrors 1101 become light beams LOa14, LOb14, and LOc14. The light beams LOa14, LOb14, and LOc14 gather at a position P1 that is in planar symmetry with the light source O1 about the plane S3 located at the center of the half mirror 1101. Thus, an image of the light source O1 is formed as a real image at the position P1.

Similarly, a light source O2 located further away from the plane S3 than the light source O1 forms an image at a position P2. As illustrated in FIG. 11A, a viewer perceives the image at the position P2 to be closer than the image at the position P1. Thus, if a 3-dimensional subject is arranged instead of the light sources O1 and O2, a real image in which the protrusion/recess relationship of the subject is inverted is formed in midair at a position in planar symmetry about the plane S3.

As described above, the optical system 1100 functions as the aerial imaging element 102, which causes a subject inputted from one surface side to be reflected so as to be formed as an image in midair on the other surface side, with respect to the plane S3, as a real image in which the protrusion/recess relationship is inverted.

The relationship between the incident light beam and the emitted light beam of the light beam forming the image is one in which the magnitude of the incident angle and the emission angle in relation to the normal line of the plane S3 is the same, but the signs differ. Thus, if the screen 103 and the optical system 1100 are arranged as illustrated in FIG. 11B, an image of the screen 103 is formed as a real image at a position in planar symmetry about the plane S3. The viewer can see the formed aerial image 104 from the direction of the arrow 105.

The aerial imaging element 102 is not limited to the examples above, and any image forming means that can define a given plane, with a subject on one side of the plane being formed as a real image in which the protrusion/recess relationship is inverted in midair on the other surface side, can be used.

Next, in order to clarify the characteristics of the present invention, the problems that arise from simply combining a conventional 3-dimensional display with a conventional aerial imaging element will be described.

First, a conventional 3-dimensional display 1201 will be described with reference to FIGS. 12 to 18 FIG. 12 is a view for describing an optical model of the 3-dimensional display 1201, which employs the conventional parallax barrier method.

A view point pixel 1222 that displays a pixel of a right eye perspective view point image, and a view point pixel 1221 displays a pixel of a left eye perspective view point image are arranged alternately.

At a position at a distance h from the pixel unit 1220, a parallax barrier 1230 provided with slits 1231 at a given interval is arranged. The slits 1231 are arranged such that each slit 1231 corresponds to one pixel unit 1220.

Here, the light beams in the 3-dimensional display 1201 are defined as follows. The light beam emitted from the left end of the view point pixel 1222 in the left end pixel unit 1220 of the display panel 1210 and passing through the center of the closest slit 1231 is LLr1, the light beam emitted from the right end of the view point pixel 1221 and passing through the center of the closest slit 1231 is LLl1, and the light beam emitted from the center of the pixel unit 1220 and passing through the center of the closest slit 1231 is LLc1. Similarly, the light beams emitted from the center pixel unit 1220 of the display panel 1210 are LCr1, LCl1, and LCc1, and the light beams emitted from the right end pixel unit 1220 of the display panel 1210 are LRr1, LRc1, and LRl1. Upon passing through the slits 1231, the light beams LLr1, LLl1, LLc1, LCr1, LCl1, LCc1, LRr1, LRl1, and LRc1 are refracted according to the difference between the refractive index n inside the 3-dimensional display 1201 and the refractive index of air. The refracted light beams are designated as LLr2, LLl2, LLc2, LCr2, LCl2, LCc2, LRr2, LRl2, and LRc2.

Figure 12:
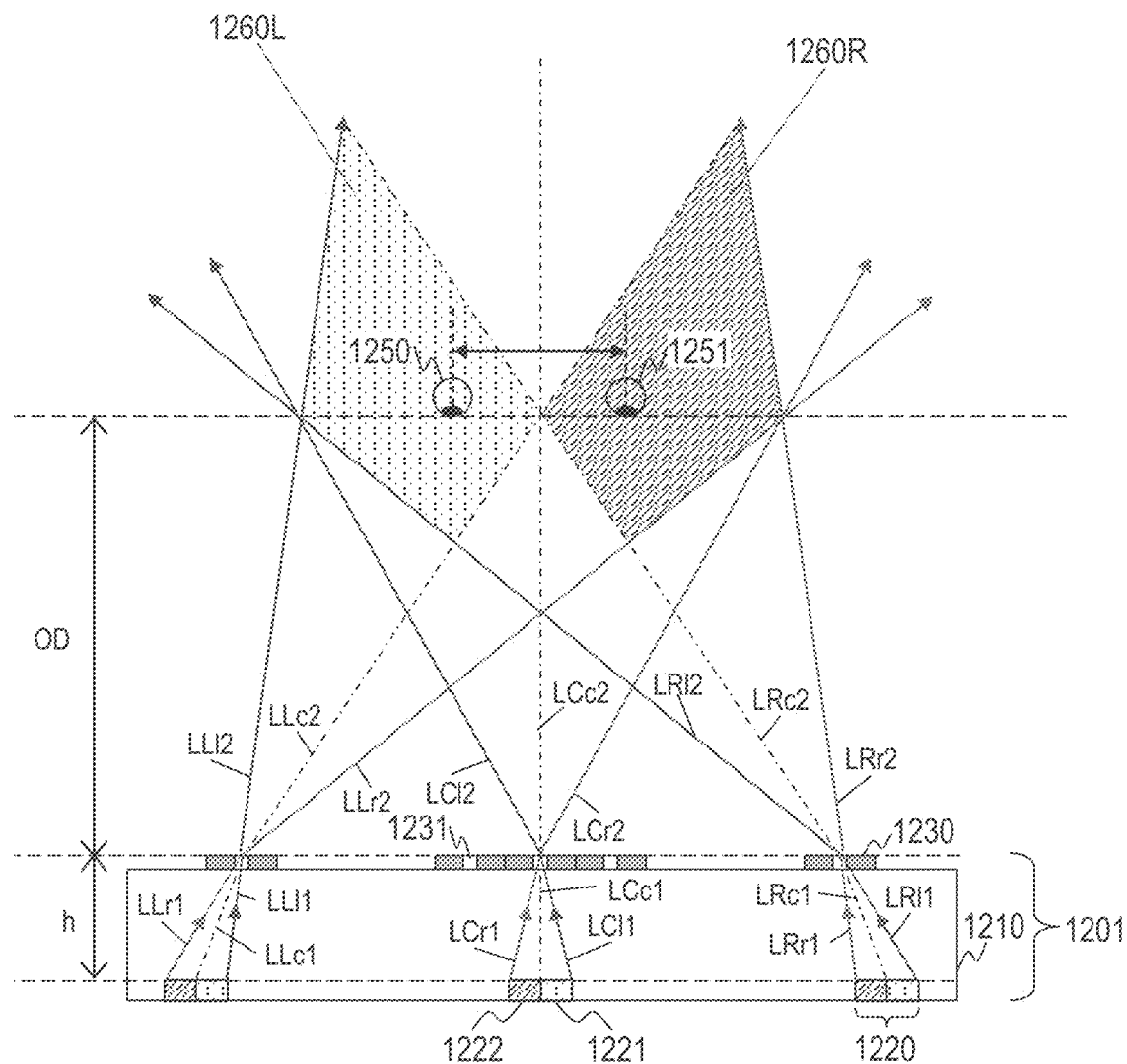
FIG. 12 is a view for describing an optical model of a conventional 3-dimensional display, which employs a parallax barrier method.

As illustrated in FIG. 12, typically, the 3-dimensional display 1201 is designed such that the light beams LLc2 and LRc2 intersect at a distance OD. A region 1260L surrounded by the light beams LLl2, LLc2, LCl2, LRl2, and LRc2 is a region where only the view point pixel 1221 can be seen, and a region 1260R surrounded by the light beams LLr2, LLc2, LCr2, LRr2, and LRc2 is a region where only the view point pixel 1222 can be seen. Below, the regions 1260L and 1260R are referred to as single view point visibility regions.

In a conventional 3-dimensional display 1201, the left eye perspective view point image is displayed by the view point pixel 1221, the right eye perspective view point image is displayed by the view point pixel 1222, and when the viewer places their left eye 1250 in the region 1260L and their right eye 1251 in the region 1260R, then the viewer can perceive a 3-dimensional image. The position at the distance OD is a position where the viewer can move the greatest amount in a direction parallel to the panel surface while viewing a desired 3-dimensional image, or in other words, the optimal viewing position. Thus, the distance OD is referred to as the optimal viewing distance.

Figure 13:
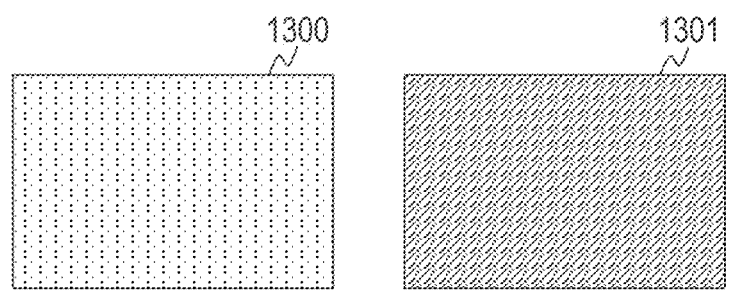
FIG. 13 is a view for describing screens of the conventional 3-dimensional display, which employs the parallax barrier method, being viewed by a viewer.

FIG. 13 is a view for describing screens of the conventional 3-dimensional display 1201, which employs the parallax barrier method, being viewed by a viewer. The screen 1300 indicates the screen viewed by the left eye 1250 of the viewer. Meanwhile, the screen 1301 indicates the screen viewed by the right eye 1251 of the viewer.

If both eyes are in the single view point visibility regions 1260L and 1260R, then the right eye 1251 can see the screen 1301 of FIG. 13, and the left eye 1250 can see the screen 1300 of FIG. 13.

Figure 14:
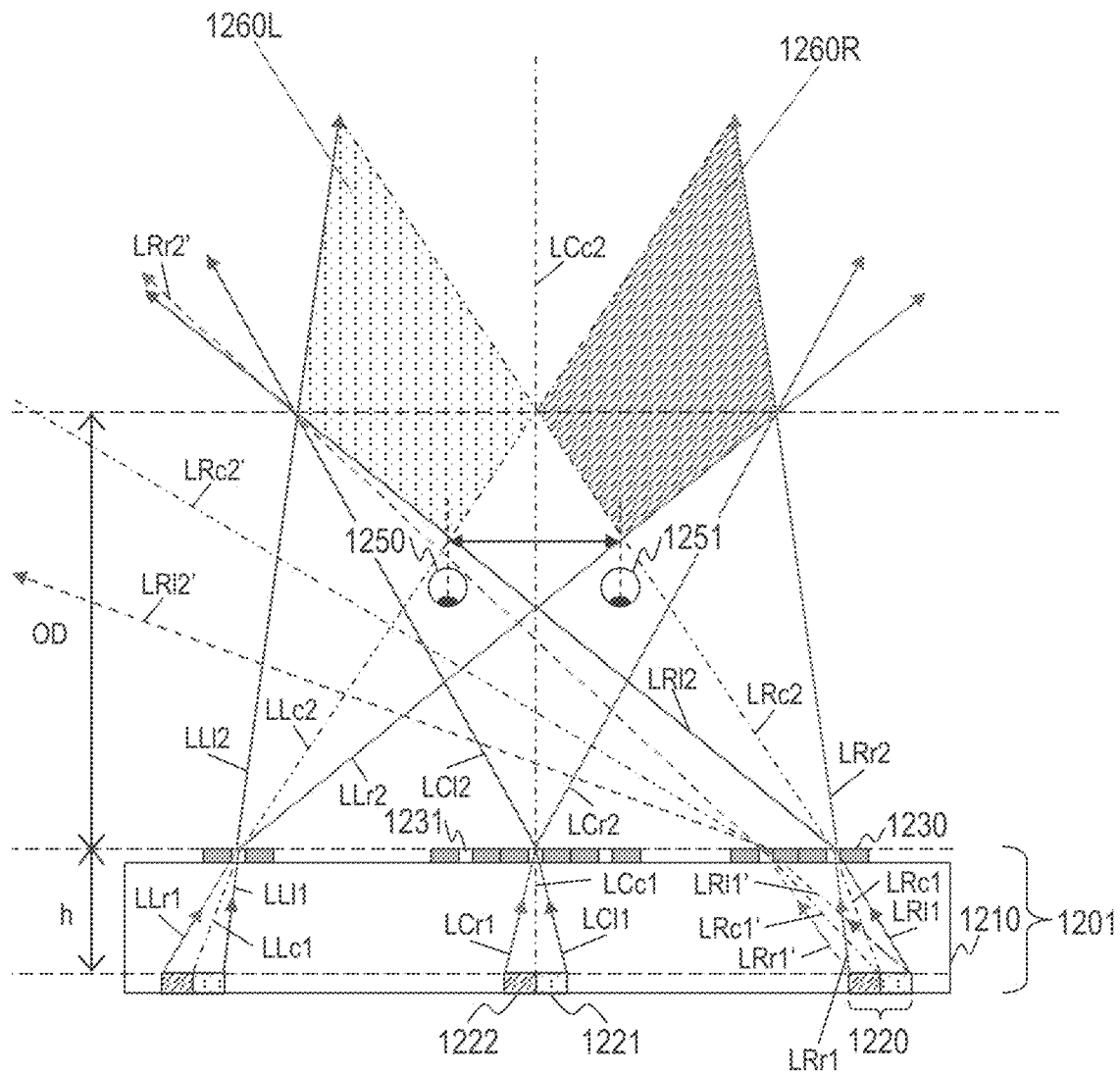
FIG. 14 is a view for describing an optical model of the conventional 3-dimensional display, which employs the parallax barrier method.
Figure 15:
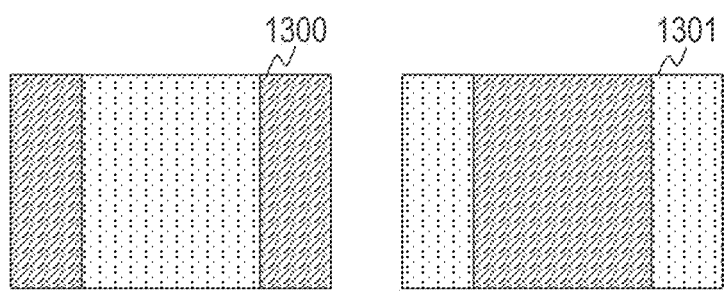
FIG. 15 is a view for describing screens of the conventional 3-dimensional display, which employs the parallax barrier method, being viewed by a viewer.

Next, an optical model and screens for when both eyes of the viewer are not in the single view point visibility regions 1260L and 1260R will be described with reference to FIGS. 14 and 15. FIG. 14 is a view for describing an optical model of the conventional 3-dimensional display 1201, which employs the parallax barrier method. FIG. 15 is a view for describing screens of the conventional 3-dimensional display 1201, which employs the parallax barrier method, being viewed by a viewer.

As illustrated in FIG. 14, the viewer is closer to the 3-dimensional display 1201. In this case, the left eye 1250 and the right eye 1251 of the viewer see the screens 1300 and 1301 illustrated in FIG. 15.

The screen 1300 viewed by the left eye 1250 will be described with reference to FIG. 14.

The left eye 1250 is positioned between the light beam LLc2 and the light beam LLr2. Thus, in the vicinity of the left end of the screen 1300, the display of the view point pixel 1222, or in other words, the view point image from the right eye perspective can be seen.

Also, the left eye 1250 is positioned between the light beam LCl2 and the light beam LCc2. Thus, in the vicinity of the center of the screen 1300, the display of the view point pixel 1221, or in other words, the view point image from the left eye perspective can be seen. Also, the left eye 1250 is not positioned between the light beam LRl2 and the light beam LRr2. In other words, the right end pixel unit 1220 cannot be viewed through the right end slit 1231 from the position of the left eye 1250 illustrated in FIG. 14.

However, the left eye 1250 is positioned between the light beam LRr2' and the light beam LRc2'. The light beams LRr2' and LRc2' result from light beams LRr1' and LRc1' emitted from the right end pixel unit 1220 passing through the second from the right slit 1231. In other words, from the position of the left eye 1250, display of the view point pixel 1222, or in other words, a view point image from the right eye perspective can be seen through the second from the right slit 1231. Thus, in the vicinity of the right end of the screen 1300, the display of the view point pixel 1222, or in other words, the view point image from the right eye perspective can be seen.

Regarding the screen 1301 (FIG. 15) seen by the right eye 1251 positioned as illustrated in FIG. 14, the left-right relationship is reversed from that of the left eye 1250, and thus, description thereof is omitted.

As illustrated in FIG. 15, if both eyes are located as illustrated in FIG. 14, then the viewer can see a desired 3-dimensional image at the center of the screen, but views a so-called inverted image at the edges of the screen in which the depth relationship is inverted. As described above, if both eyes of the viewer are located outside of the single view point visibility regions 1260L and 1260R, the viewer cannot see a desired 3-dimensional image.

Next, the problems that arise from combining the conventional 3-dimensional display 1201 with the conventional aerial imaging element 1202 will be described.

Figure 16:
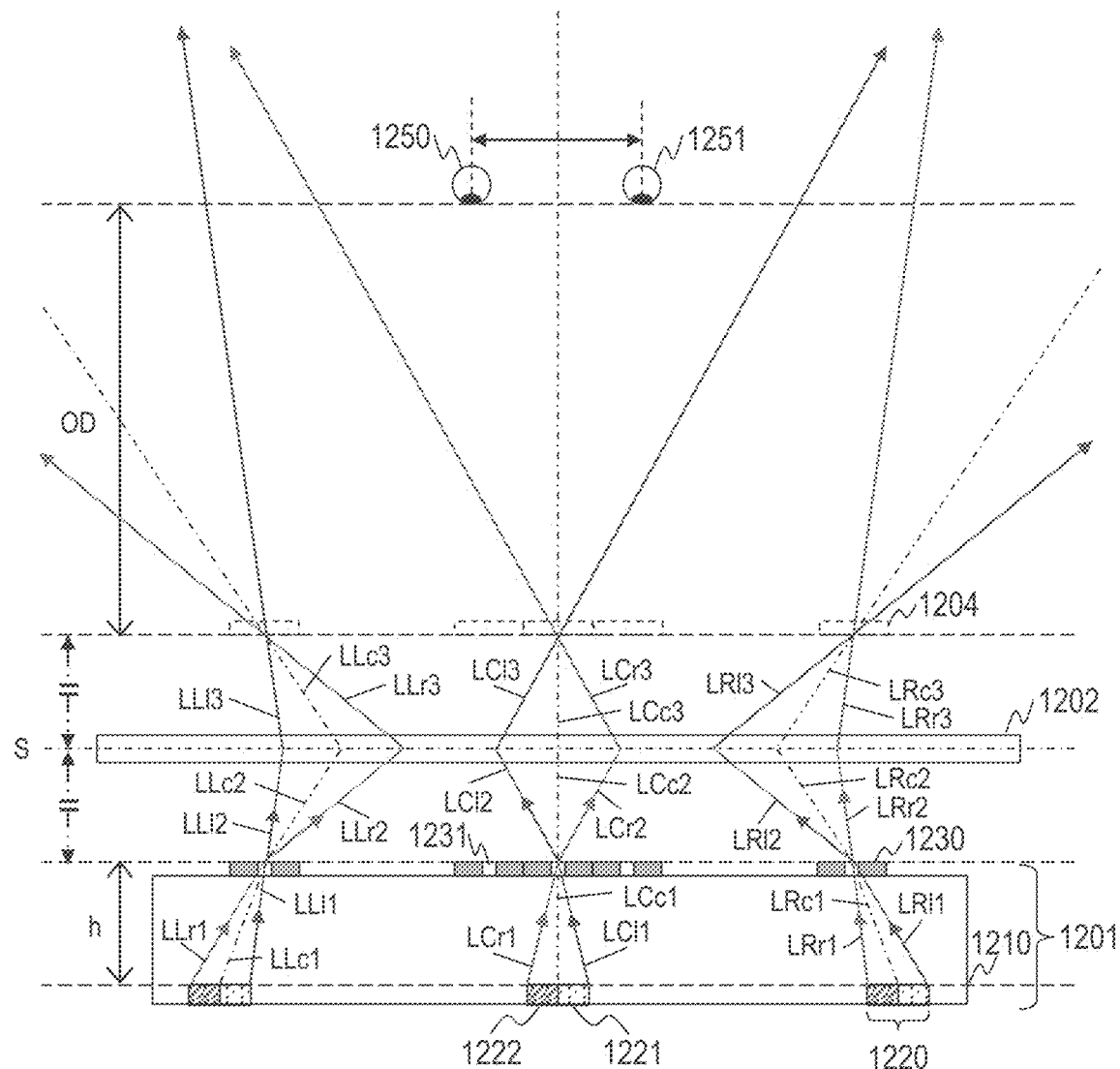
FIGS. 16 and 17 are views for describing an optical model of an image display device that combines the conventional 3-dimensional display with a conventional aerial imaging element.
Figure 17:
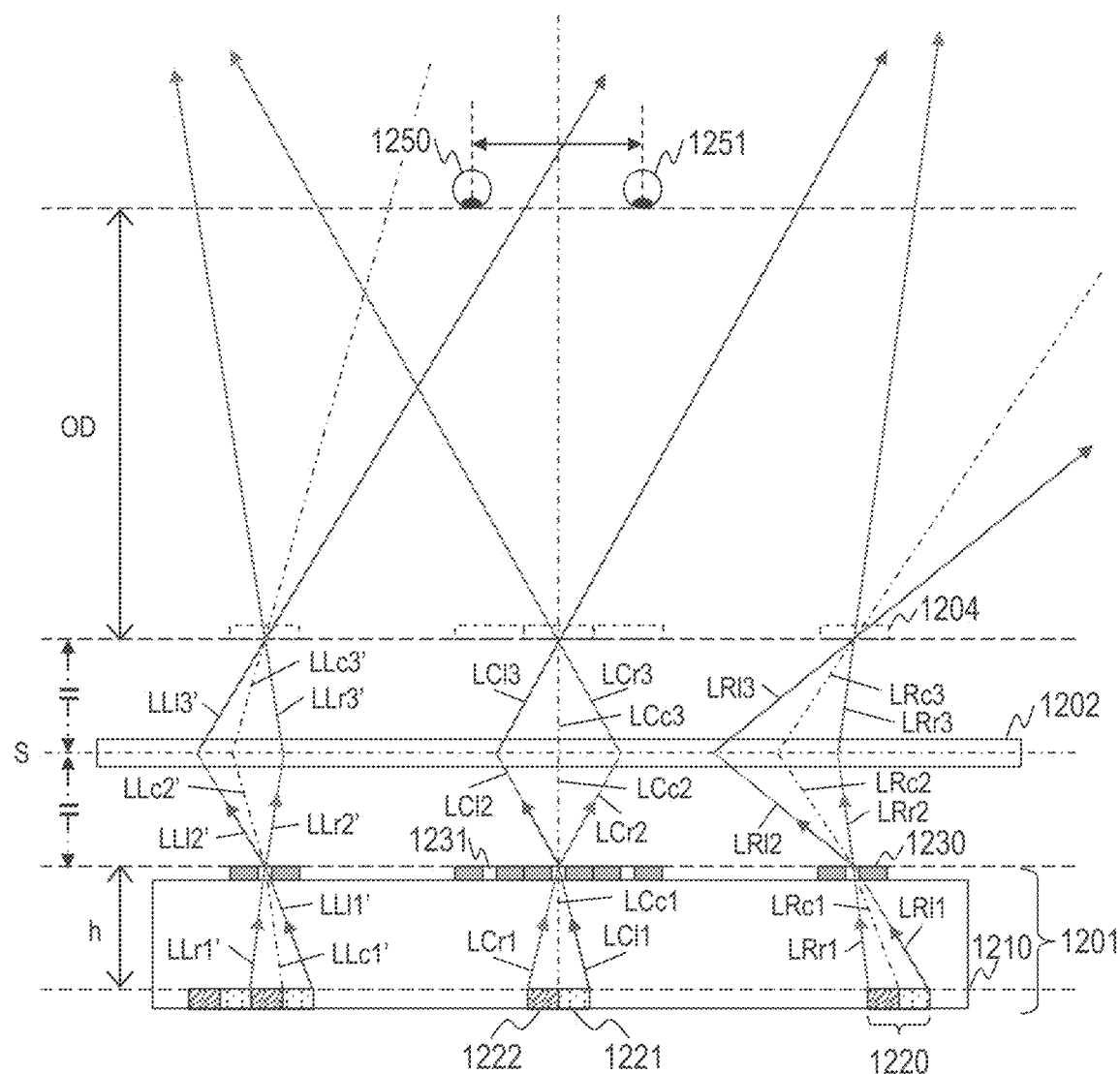
Figure 18:
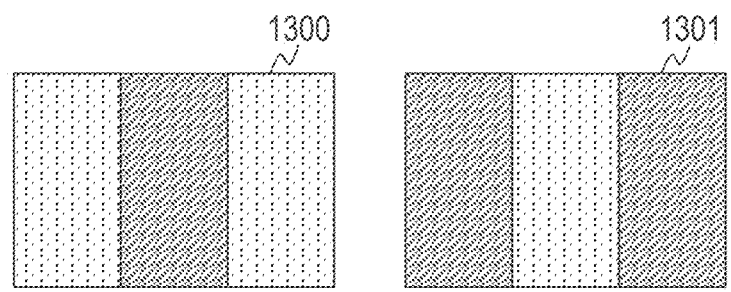
FIG. 18 is a view for describing screens of the image display device, which combines the conventional 3-dimensional display with the conventional aerial imaging element, being viewed by a viewer.

FIGS. 16 and 17 are for describing an optical model of an image display device that combines the conventional 3-dimensional display 1201 with the conventional aerial imaging element 1202. FIG. 18 is for describing screens of the image display device, which combines the conventional 3-dimensional display 1201 with the conventional aerial imaging element 1202.

Similar to FIG. 12, the light beams LLr1, LLc1, and LLl1 emitted from the left end pixel unit 1220 of the display panel 1210 are refracted upon passing the slits 1231, becoming light beams LLr2, LLc2, and LLl2, and these light beams enter the aerial imaging element 1202. As previously described, according to the relationship between the incident light beams to the aerial imaging element 1202 and the light beams emitted therefrom, which contribute to image-forming, the emission angles of the light beams LLr2, LLc2, and LLl2 are of the same magnitude as but with reversed signs from the incident angles, and thus, the light beams LLr2, LLc2, and LLl2 are emitted as the light beams LLr3, LLc3, and LLl3. The light beams LCr1, LCc1, and LCl1 emitted from the center pixel unit 1220 of the display panel 1210 are refracted upon passing the slits 1231, enter the aerial imaging element 1202 as light beams LCr2, LCc2, and LCl2, and then are emitted from the aerial imaging element 1202 as light beams LCr3, LCc3, and LCl3. Also, the light beams LRr1, LRc1, and LRl1 emitted from the right end pixel unit 1220 of the display panel 1210 are refracted upon passing the slits 1231, enter the aerial imaging element 1202 as light beams LRr2, LRc2, and LRl2, and then are emitted from the aerial imaging element 1202 as light beams LRr3, LRc3, and LRl3.

In this manner, the light emitted from the screen of the 3-dimensional display 1201 forms an image at a symmetrical position with respect to the plane S of the aerial imaging element 1202 to become an aerial image.

The light beams LLc3 and LRc3 traveling towards the viewer from both ends of the aerial image do not intersect on the viewer side of the plane S, as illustrated in FIG. 16. In other words, if the conventional 3-dimensional display 1201 and the conventional aerial imaging element 1202 were simply combined, the single view point visibility regions 1260L and 1260R such as those of FIG. 12 are not formed. Thus, even if the viewer put both eyes at the distance OD from the aerial image, the viewer could not view the desired 3-dimensional image.

As illustrated in FIG. 16, the left eye 1250 and the right eye 1251 of the viewer are not positioned between the light beam LLl3 and the light beam LLr3. Similarly, the left eye 1250 and the right eye 1251 of the viewer are not positioned between the light beam LRl3 and the light beam LRr3. In other words, the viewer cannot see the pixel units 1220 on both ends through the slits 1231 on both ends of the 3-dimensional display 1201.

In reality, the light beams entering the eyes of the viewer are light beams emitted not from the pixel unit 1220 at the closest end from the slit 1231 on the end, but from an inner pixel unit. An example thereof is illustrated in FIG. 17. The light beams emitted from the second from left end pixel unit 1220 and passing the left end slit 1231 are designated as LLr1', LLc1', and LLl1', and the light beams that have passed through the slit 1231 and refracted are designated as LLr2', LLc2', and LLl2'. The light beams LLr2', LLc2', and LLl2' enter the aerial imaging element 1202, and are emitted as light beams LLr3', LLc3', and LLl3' with emission angles of the same magnitude as but with opposite signs to the incident angle.

As illustrated in FIG. 17, the left eye 1250 is positioned between the light beam LLl3' and the light beam LLc3'. In other words, the view point image formed in midair out of the left end slit 1231 seen from the left eye position is the left eye perspective view point image formed by the view point pixel 1221. Meanwhile, the view point image formed in midair out of the center slit 1231 seen from the left eye position is the right eye perspective view point image formed by the view point pixel 1222.

Thus, if simply combining the conventional 3-dimensional display 1201 with the conventional aerial imaging element 1202, then as illustrated in FIG. 18, images in which left eye perspective view point images and right eye perspective view point images appear alternately in the screens 1300 and 1301 are inputted to the left eye 1250 and the right eye 1251 of the viewer. Thus, the viewer could not view the desired 3-dimensional image.

In order to solve the above problem, it is necessary to have a 3-dimensional display in which light beams heading from the aerial image to the viewer form the single view point visibility regions 1260L and 1260R, in consideration of changes in directivity of light contributing to image-forming by the aerial imaging element such as that described above. The 3-dimensional display 101 of the present disclosure is designed such that, in order to form the single view point visibility regions 1260L and 1260R, light beams emitted from the centers of the pixel units 120 on both ends of the screen and passing through the slits 131 on both ends undergo a change in directivity as a result of the aerial imaging element 102 and then intersect each other at the distance OD from the aerial image 104.

Below, characteristics of the image display device 100 in which the light beams, heading to the viewer from the aerial image 104 of the 3-dimensional display 101 that was formed by the aerial imaging element 102, form the single view point visibility regions 1260L and 1260R will be described.

Figure 19:
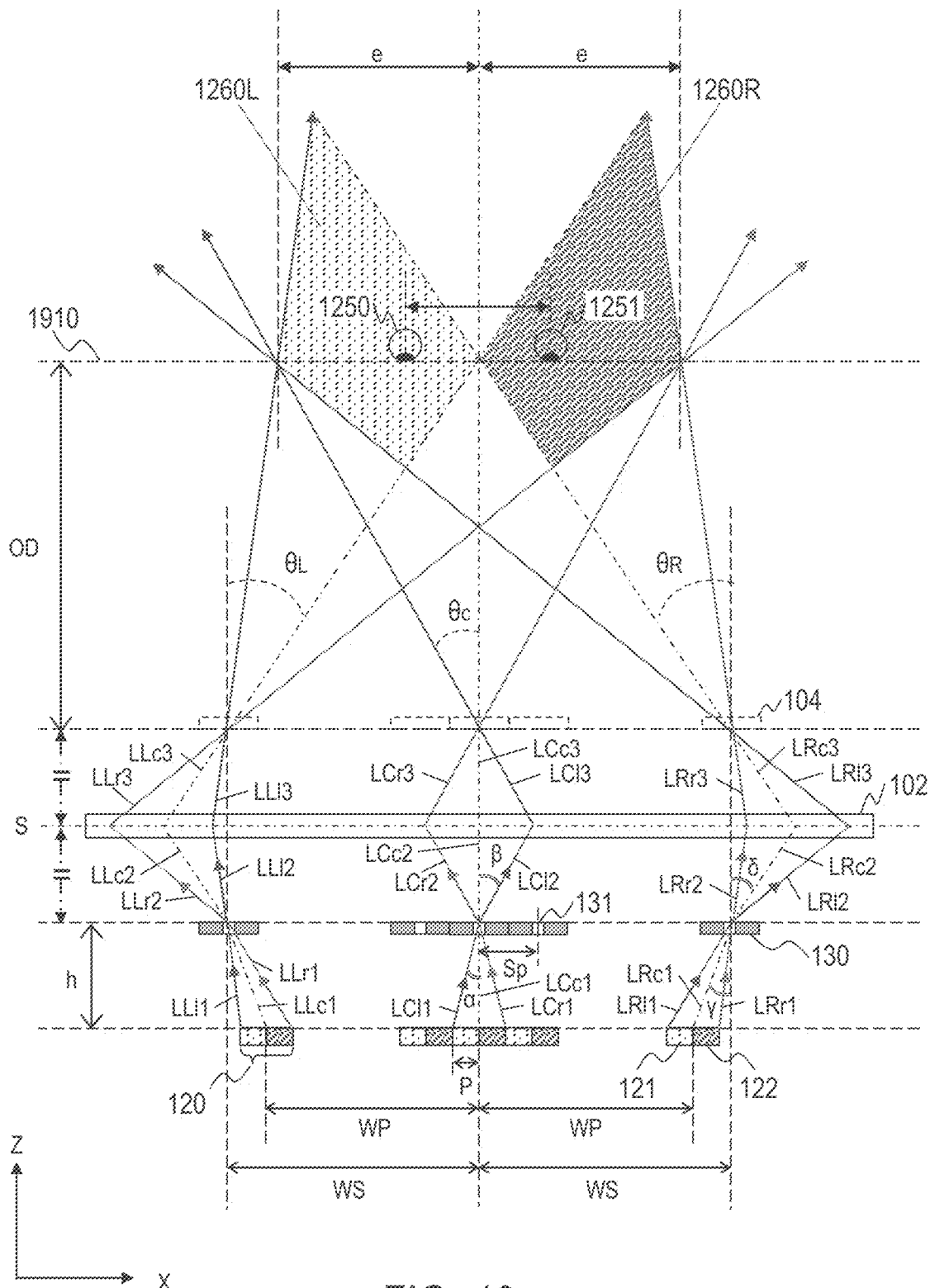
FIGS. 19 and 20 are views for describing an example of an optical model of the image display device of the present disclosure.
Figure 20:
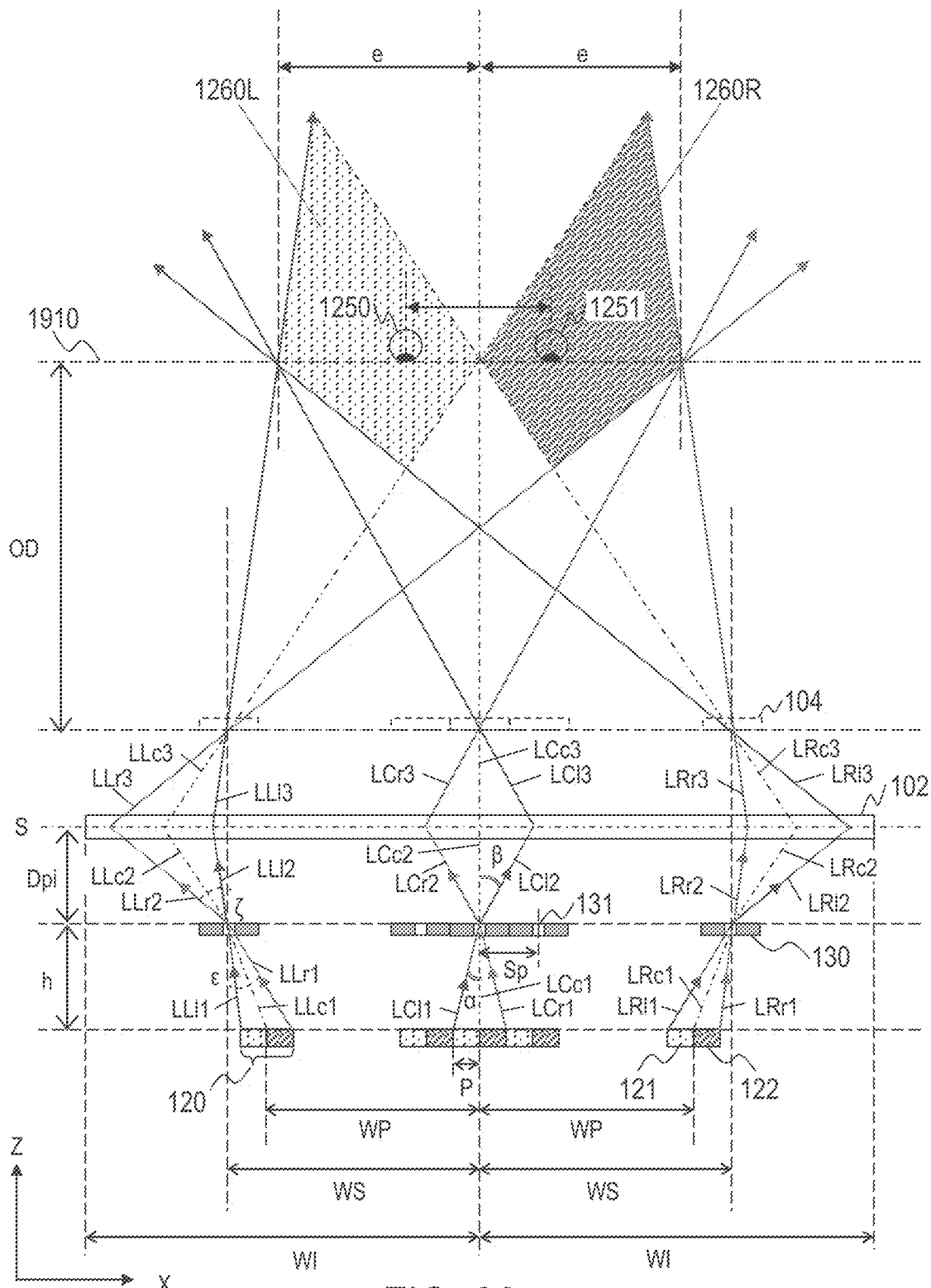

FIGS. 19 and 20 are views for describing an example of an optical model of the image display device 100 of the present disclosure.

FIG. 19 is an optical model of light beams reaching the viewer from the A-A' cross-section in the configuration of the image display device 100 of FIG. 1, and is a projection onto the XZ plane.

The left eye 1250 and the right eye 1251 are the eyes of the viewer. The aerial image 104 represents a screen of the 3-dimensional display 101 to be formed by the aerial imaging element 102. A virtual plane 1910 represents the position at which the 3-dimensional image can be viewed in a suitable state. The virtual plane 1910 is a plane that is parallel to the line connecting the eyes, and this plane is set at a position where the light emitted from the pixel units 120 overlaps to the greatest degree. In the description below, the arrangement pattern of the slits 131 is the arrangement pattern illustrated in FIG. 3. First, the parameters will be described.

A pitch P indicates the pitch of the view point pixels 121 and 122. If the pixel units 120 are constituted of two view point pixels 121 and 122 as described previously, the pitch of the pixel units 120 is 2P. A pitch Sp represents the interval of the slits 131. The distance h represents the distance between the view point pixel 121 or the view point pixel 122 and the parallax barrier 130. A width WP represents the distance from the center of the pixel unit 120 arranged at the center of the display panel 110 to the center of the pixel unit 120 arranged at each edge of the display panel 110. A width WS represents the distance from the center slit 131 of the parallax barrier 130 to each edge slit 131. The distance OD represents the distance from the aerial image 104 to the virtual plane 1910. In other words, the distance OD is the optimal viewing distance from the aerial image 104. A width e represents the expanded projection width of the view point pixel 121 and the view point pixel 122 at the pitch P in the virtual plane 1910. In other words, the width e represents the enlarged projection width of half of the pitch of the pixel unit 120 in the virtual plane 1910.

Also, the number of pixel units 120 from the center to the edge in the X direction of the display panel is the pixel count m. The refractive index inside the 3-dimensional display 101 is the refractive index n.

An angle α represents the maximum incident angle of light entering the slit 131 at the minimum distance from the pixel unit 120 arranged at the center of the display panel 110. In other words, the incident angle of the light beam LCr1 and the light beam LCl1 illustrated in FIG. 19 to the slit 131 is the angle α.

An angle β represents the emission angle of the light beams that have entered the slit 131 at the angle α. As previously mentioned, the normal line vector of the display surface of the display panel 110 projected on the XZ plane overlaps the normal line vector of the plane S of the aerial imaging element 102 projected on the XZ plane, and thus, the incident angle of the light beam LCr2 and the light beam LCl2 into the aerial imaging element 102 is the angle β.

An angle γ represents the incident angle of light entering the slit 131 arranged at the edge of the parallax barrier 130 from the center of the pixel unit 120 arranged at the edge of the display panel 110. In other words, the incident angle of the light beam LLc1 and the light beam LRc1 illustrated in FIG. 19 to the slit 131 is the angle γ.

An angle δ represents the emission angle of light entering the slit 131 at the angle γ, and the incident angle of the light beam LLc2 and the light beam LRc2 into the aerial imaging element 102 is the angle δ.

As illustrated in FIG. 19, the 3-dimensional display 101 is designed such that the light beams headed towards the viewer side from the aerial image 104 form the single view point visibility regions 1260L and 1260R. Specifically, the parameters are set as described below such that the light beam LLc3 and the light beam LRc3 emitted from the aerial imaging element 102 intersect at the distance OD.

As illustrated in FIG. 19, where the angles of the light beam LLc3 and the light beam LRc3 are set to θL and θR, then due to geometric symmetry, θL and θR are equal to each other. Additionally, due to characteristics of the aforementioned aerial imaging element 102, θL and θR are both the angle δ in magnitude. Thus, formula (1) holds according to the condition that the light beams LLc3 and LRc3 intersect at the distance OD.

$$WS = OD \cdot \tan \delta \quad (1)$$

The width WS in formula (1) is obtained from formula (2) according to the pitch Sp and the pixel count m.

$$WS = m \cdot Sp \quad (2)$$

With respect to the angle δ in formula (1), formula (3) holds according to the refractive index n in the 3-dimensional display 101 and Snell's law.

$$n \cdot \sin \gamma = \sin \delta \quad (3)$$

With respect to the angle γ, formula (4) holds according to the geometric relationship between the distance h from the parallax barrier 130 to the pixel unit 120 illustrated in FIG. 19, the width WS, and the width WP.

$$\tan \gamma = \frac{WS - WP}{h} \quad (4)$$

With respect to the width WP in formula (4), formula (5) holds according to the number of view points, the pitch P of the view point pixels, and the pixel count m. The coefficient "2" in formula (5) is the number of view points.

$$WP = 2 \cdot m \cdot P \quad (5)$$

According to formulas (1) to (5), the relationship between the pitch 2P of the pixel units 120 and the pitch Sp is determined according to the distance OD, the distance h, the refractive index n, and the pixel count m. For ease of description of the relational formula of 2P and Sp, the approximation of formula (6) is set. By rearranging formulas (1) to (5), formula (7) can be derived.

$$\sin \delta \approx \tan \delta \quad (6)$$

$$\frac{2 \cdot m \cdot P}{m \cdot Sp} = \frac{n \cdot OD}{(n \cdot OD - h)} \quad (7)$$

As indicated in formula (7), if the distance OD, the distance h, the refractive index n, the pixel count m, and the pitch 2P of the pixel unit 120 are determined using formulas (1) to (5), the pitch Sp of the 3-dimensional display 101 at the distance OD where the light beams LLc3 and LRc3 intersect can be calculated. The approximation of formula (7) does not work if the distance WP becomes too long in relation to the distance OD. Even in such a case, an analytic means can be used from the parameters determined in formulas (1) to (5) to calculate the pitch Sp where the light beams LLc3 and LRc3 intersect at the distance OD.

However, by only satisfying the conditions of formulas (1) to (5), a desired value cannot be obtained for the projection width e of the view point pixels, which determines the width of the single view point visibility regions 1260L and 1260R.

One of the conditions allowing the viewer to perceive a 3-dimensional image is that the left eye 1250 is located in the left eye region 1260L, and that the right eye 1251 is located in the right eye region 1260R. Since the distance between the eyes of the viewer is constant, if the width e is less than half the distance between the eyes, this condition cannot be met. That is, the viewer would not be able to view the 3-dimensional image.

In general, the average distance between the eyes of an adult male is 65 mm with a standard deviation of ±3.7 mm, and the average distance between the eyes of an adult female is 62 mm with a standard deviation of ±3.6 mm (Neil A Dogson, "Variation and extrema of human interpupillary distance", Proc. SPIE vol. 5291). Thus, if the distance between the eyes of the viewer is 65 mm, then the width e needs to be at least 32.5 mm.

In consideration of increasing the range at which the viewer can move in the parallel direction (X direction) while maintaining a state in which both eyes are positioned in the prescribed single view point visibility regions, or in other words, a state in which the viewer can perceive the 3-dimensional image, 65 mm or greater is a suitable value for the width e.

The width e is the enlarged projection width of the view point pixels at the pitch P, and the following relational formula is set according to the pitch P, the distance OD, the distance h, and the refractive index n.

Regarding the light beam LCl3 in FIG. 19, the width e is the tangent of the distance OD. The size of the angle θc of the light beam LCl3 is the angle β due to characteristics of the aforementioned aerial imaging element 102. Thus, formula (8) holds.

$$e = OD \cdot \tan \beta \quad (8)$$

The angle β in formula (8) satisfies formula (9) according to the refractive index n in the 3-dimensional display 101 and Snell's law.

$$n \cdot \sin \alpha = \sin \beta \quad (9)$$

The angle α in formula (9) satisfies the formula (10) according to the geometric relationship between the pitch P and the distance h.

$$\tan \alpha = \frac{P}{h} \quad (10)$$

Thus, by determining the pitch P, the distance OD, the distance h, and the refractive index n using formulas (8) to (10), the width e can be set to a desired value, and the values of the parameters for which the width e was set can be used in formulas (1) to (5) to calculate the pitch Sp.

In the present disclosure, the pitch Sp of the 3-dimensional display 101 is characterized by being a value calculated using formulas (1) to (5) and (8) to (10).

If there are N view point pixels in the X direction of the pixel unit 120, then the width WP defined in formula (11) should be used instead of the width WP defined in formula (5).

$$WP = N \cdot m \cdot P \quad (11)$$

Also, in setting the width e, the angle α should be calculated according to the half value of the pitch (NT) of the pixel unit 120 and the distance h. In other words, formula (12) would be used instead of formula (10).

$$\tan \alpha = \frac{N \cdot P / 2}{h} \quad (12)$$

By combining the 3-dimensional display 101 and the aerial imaging element 102 designed as described above, the light beams traveling from the aerial image 104 to the viewer as illustrated in FIG. 19 form the single view point visibility regions 1260L and 1260R.

Thus, when the left and right view point images are displayed in the view point pixels 121 and 122, and when the left eye 1250 is positioned in the left eye region 1260L and the right eye 1251 is positioned in the right eye region 1260R, the viewer can perceive a suitable 3-dimensional image throughout the entire screen.

If the viewer directly views the 3-dimensional display 101 illustrated in FIG. 19 without the aerial imaging element 102 therebetween, the viewer would not be able to perceive a desired 3-dimensional image. This is because, as illustrated in FIG. 19, the light beams LLc2 and LRc2 that pass through the slits 131 on both ends do not intersect, and thus, no single view point visibility region is formed. In this case, the light beams traveling towards the viewer form an optical model similar to those of FIGS. 16 and 17, and the screen seen by the viewer is similar to that of FIG. 18. In other words, the viewer would see an image in which both normal view regions and reverse view regions are present in the screen.

The single view point visibility region 1260L is a region surrounded by the light beams LLl3, LLc3, LCl3, LRl3, and LRc3, and the single view point visibility region 1260R is a region surrounded by the light beams LRr3, LLr3, LLc3, LRc3, and LCr3. Thus, the aerial imaging element 102 of the present disclosure needs to have a width allowing passage of at least these light beams in the X direction.

The width necessary for the aerial imaging element 102 will be described with reference to FIG. 20.

The distance from the center to the edge of the aerial imaging element 102 is designated as a distance WI, the distance from the parallax barrier 130 of the 3-dimensional display 101 to the plane S of the aerial imaging element 102 is designated as a distance Dpi, the incident angle of the light beams LLr1 and LLl1 to the slit 131 is designated as an angle ε, and the emission angle of the light beams LLr2 and LLl2 from the slit 131 is designated as an angle ζ. The aerial imaging element 102 illustrated in FIG. 20 has a width enabling the light beams LLr3 and LRl3 to be emitted from the edges.

Thus, formula (13) holds.

$$WI = WS + DPi \cdot \tan \zeta \quad (13)$$

With respect to the angles $\zeta$ and $\varepsilon$, formula (14) holds according to the refractive index n in the 3-dimensional display 101 and Snell's law.

$$n \cdot \sin \varepsilon = \sin \zeta \quad (14)$$

Also, regarding the angle $\varepsilon$ in formula (14), the formula (15) holds according to the geometric relationship between the width WS, the width WP, the pitch P, the distance h.

$$\tan \varepsilon = \frac{WS - WP - P}{h} \quad (15)$$

The angle $\zeta$ is represented as indicated in formula (16) according to formulas (14) and (15), and the angle $\varepsilon$ is represented as indicated in formula (17).

$$\zeta = \arcsin(n \cdot \sin \varepsilon) \quad (16)$$

$$\varepsilon = \arctan\left(\frac{WS - WP - P}{h}\right) \quad (17)$$

If formula (13) is rearranged using formulas (15) to (17), the distance WI is represented as indicated in formula (18).

$$WI = WS + Dpi \cdot \tan\left(\arcsin\left(n \cdot \sin\left(\arctan\left(\frac{WS - WP - P}{h}\right)\right)\right)\right) \quad (18)$$

In other words, the width WI can be calculated from the width WS, the width WP, the pitch P, the distance h, and the distance Dpi. The width WS may be calculated from formula (2) and the width WP may be calculated from formula (5).

As described above, in the image display device 100 of the present disclosure, the width WI of the aerial imaging element 102 necessary in order for the single view point visibility regions 1260L and 1260R to be formed by light beams on both ends of the 3-dimensional display 101 must satisfy formula (19).

$$WI \geq WS + Dpi \cdot \tan\left(\arcsin\left(n \cdot \sin\left(\arctan\left(\frac{WS - WP - P}{h}\right)\right)\right)\right) \quad (19)$$

If there are N view point pixels in the X direction of the pixel unit 120, then the width WP defined in formula (20) should be used instead of the width WP defined in formula (5).

$$WP = N \cdot m \cdot P \quad (20)$$

At this time, the width WI must satisfy formula (21).

$$WI \geq WS + Dpi \cdot \tan\left(\arcsin\left(n \cdot \sin\left(\arctan\left(\frac{WS - WP - N \cdot P/2}{h}\right)\right)\right)\right) \quad (21)$$

Here, problems regarding the image display device disclosed in JP 2017-10014 A will be described with reference to FIGS. 21 to 22.

Figure 21A:
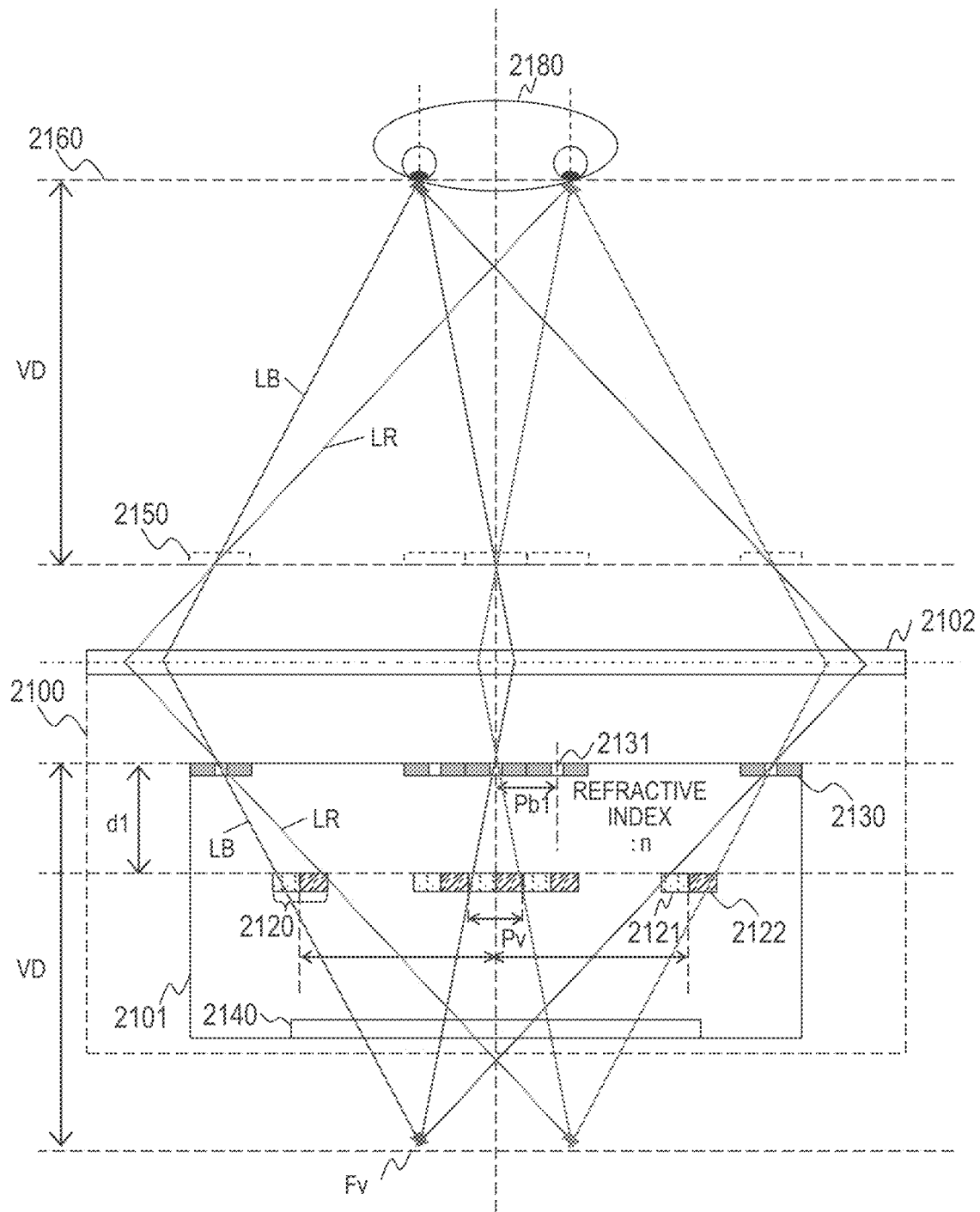
FIGS. 21A and 21B are views for describing an optical model of an image display device disclosed in JP 2017-10014 A.
Figure 21B:
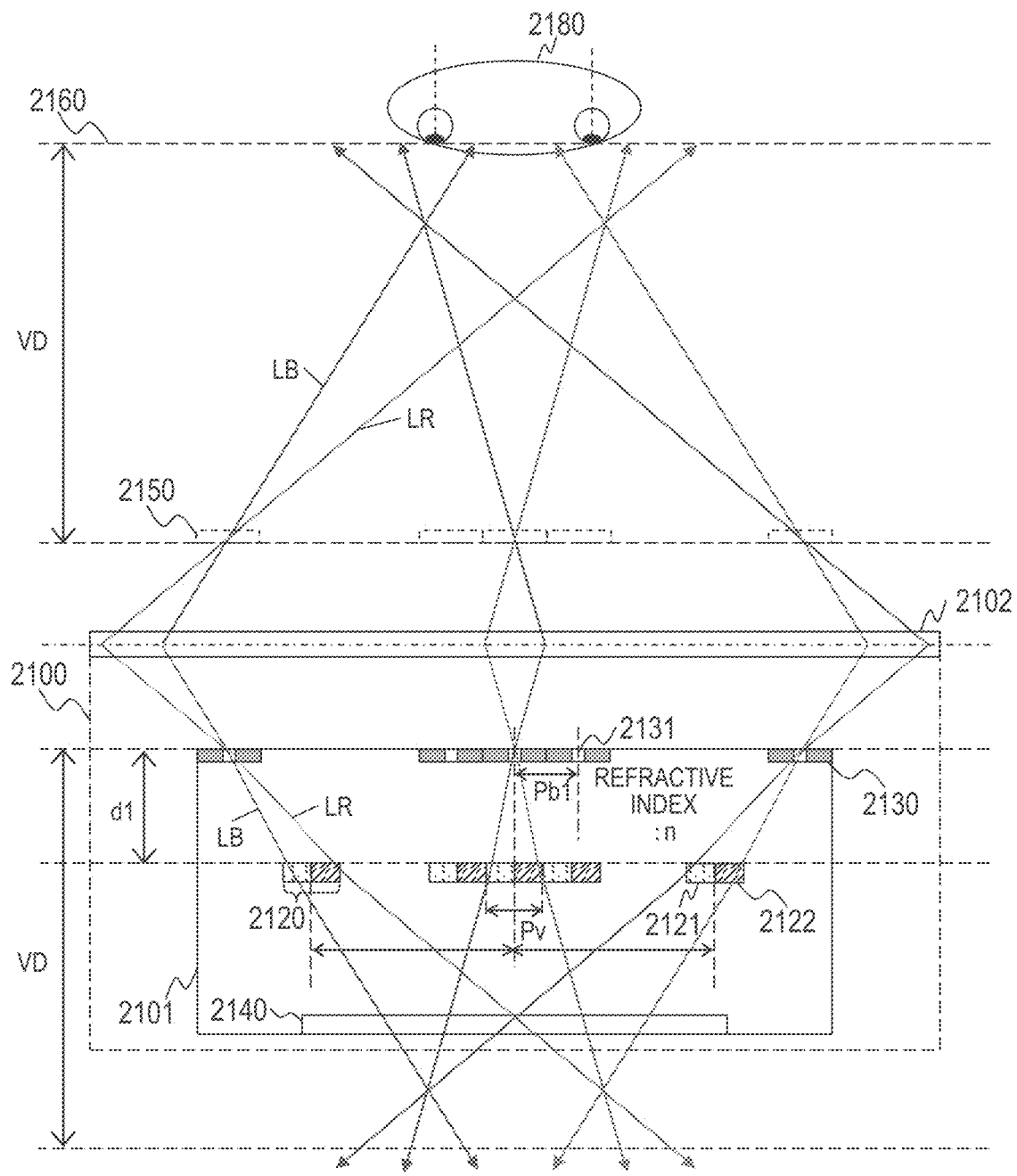

FIGS. 21A and 21B are views for describing an optical model of the image display device disclosed in JP 2017-10014 A. FIG. 21A illustrates an idealized optical model of the image display device disclosed in JP 2017-10014 A, and FIG. 21B illustrates an actual optical model of the image display device disclosed in JP 2017-10014 A. Here, a case in which the pixels that provide a plurality of view point groups provide two view points will be described.

JP 2017-10014 A discloses an image display device 2100 including a 3D-display module 2101 and an optical element 2102. The 3D-display module 2101 includes a backlight light source 2140, a plurality of pixels 2120, and a parallax barrier 2130. The pixels 2120 include a plurality of view point groups. Here, two view point groups 2121 and 2122 are included.

In JP 2017-10014 A, the pitch of the pixels 2120 is defined as Pv, the pitch of the openings 2131 of the parallax barrier 2130 is defined as Pb1, and the distance between the parallax barrier 2130 and the pixels 2120 is defined as d1. Also, light from the backlight light source 2140 is focused at a virtual focal point Fv, and the backlight light source 2140 is located between the virtual focal point Fv and the optical element 2102. The distance from the virtual focal point Fv to the parallax barrier 2130 is defined as a distance VD, and the distance from the viewer 2180 to a virtual floating base plane 2150 (aerial image 104 of present disclosure) is equal to the distance from the virtual focal point Fv to the parallax barrier 2130. In other words, the distance between the virtual floating base plane 2150 and a virtual plane 2160 set as the viewing position for the viewer 2180 is defined as VD.

JP 2017-10014 A indicates that the ratio of the pitch Pb1 in relation to the pitch Pv is VD/(VD−d1). Thus, the pitch Pb1 of the openings 2131 of the parallax barrier 2130 can be calculated by formula (22) as long as VD, Pv, and d1 are defined.

$$\frac{Pb1}{Pv} = \frac{VD}{(VD - d1)} \quad (22)$$

The optical model (FIG. 21A) disclosed in JP 2017-10014 A and formula (22) are established when the refractive index n inside the 3D-display module 2101, which corresponds to the 3-dimensional display 101 of the present disclosure, is 1.

However, in reality, it is not possible to set the refractive index n inside the 3D-display module 2101 to the same as that of air (n=1). Thus, as illustrated in FIG. 21A, the light beams LB, LR passing through the openings 2131 do not form straight lines, and refract, resulting in the optical model illustrated in FIG. 21B.

As illustrated in FIG. 21B, when refraction is taken into consideration, the point where the backlight light source 2140 is focused is located in a position at a shorter distance than the distance VD, and it can be seen that in order for the viewer 2180 to perceive a suitable 3-dimensional image, the viewer must observe the image display device 2100 at a position closer than the distance VD.

Next, regarding problems with the design derived from the disclosure of JP 2017-10014 A, specific values are set in formula (22) and considered.

The first problem is that design requirements pertaining to the expanded projection width e of the view point pixels determined according to VD (OD in the present disclosure), d1 (h in the present disclosure), and Pv (width 2·P of pixel unit in present disclosure) are not explicitly mentioned in JP 2017-10014 A. Thus, depending on the settings for VD, d1, and Pv, the width e may be less than half the distance between the eyes (32.5 mm).

Values for d1 and the width e for when VD is 500 mm and Pv is 0.2 mm will be considered here, for example. In the aforementioned formulas (8) to (10), if calculations are performed with n=1, OD=VD, and P=Pv/2, then if d1 becomes less than 1.54 mm, then the width e becomes less than 32.5 mm, preventing the viewer from being able to perceive a 3-dimensional image. In other words, if an image display device is designed by calculating the pitch Pb1 according to formula (22) with VD being 500 mm, Pv being 0.2 mm, and d1 being 1.54 mm, then the viewer would not be able to perceive a 3-dimensional image at a position at the distance VD.

The second problem is that in JP 2017-10014 A, the refractive index in the 3D-display module 2101 is not considered. Thus, the position where light beams from both ends of the screen intersect is not considered. Here, if a value for d1 that allows the width e to be 65 mm where VD is 500 mm, Pv is 0.2 mm, and n=1 is calculated according to formulas (8) to (10) of the present disclosure as previously described, d1 would be 0.77 mm. If VD is 500 mm, Pv is 0.2 mm, and d1 is 0.77 mm, then Pb1 is calculated as 0.200308 mm according to formula (22). Table 1 compiles design values for VD, Pv, d1, and Pb1.

TABLE 1

| Design item | Reference character (See Patent Document 4) | Design value |
| --- | --- | --- |
| Distance from aerial image to viewing position | VD | 500 mm |
| Number of view points | | 2 |
| Width of pixel unit | Pv | 0.2 mm |
| Distance between parallax barrier and pixels | d1 | 0.77 mm |
| Parallax barrier Pitch of opening | Pb1 | 0.200308 mm |
| Where refractive index n = 1 Expanded projection width of view point pixels | e | 65 mm |

If the 3D-display module 2101 is designed according to table 1, then the effect of the actual refractive index is considered using the intersection point between the light beam LLc3 and the light beam LRc3 illustrated in the optical model of FIG. 19. As defined in FIG. 19, the distance from the aerial image 104 to the intersection between the light beams LLc3 and LRc3 is OD.

Figure 22:
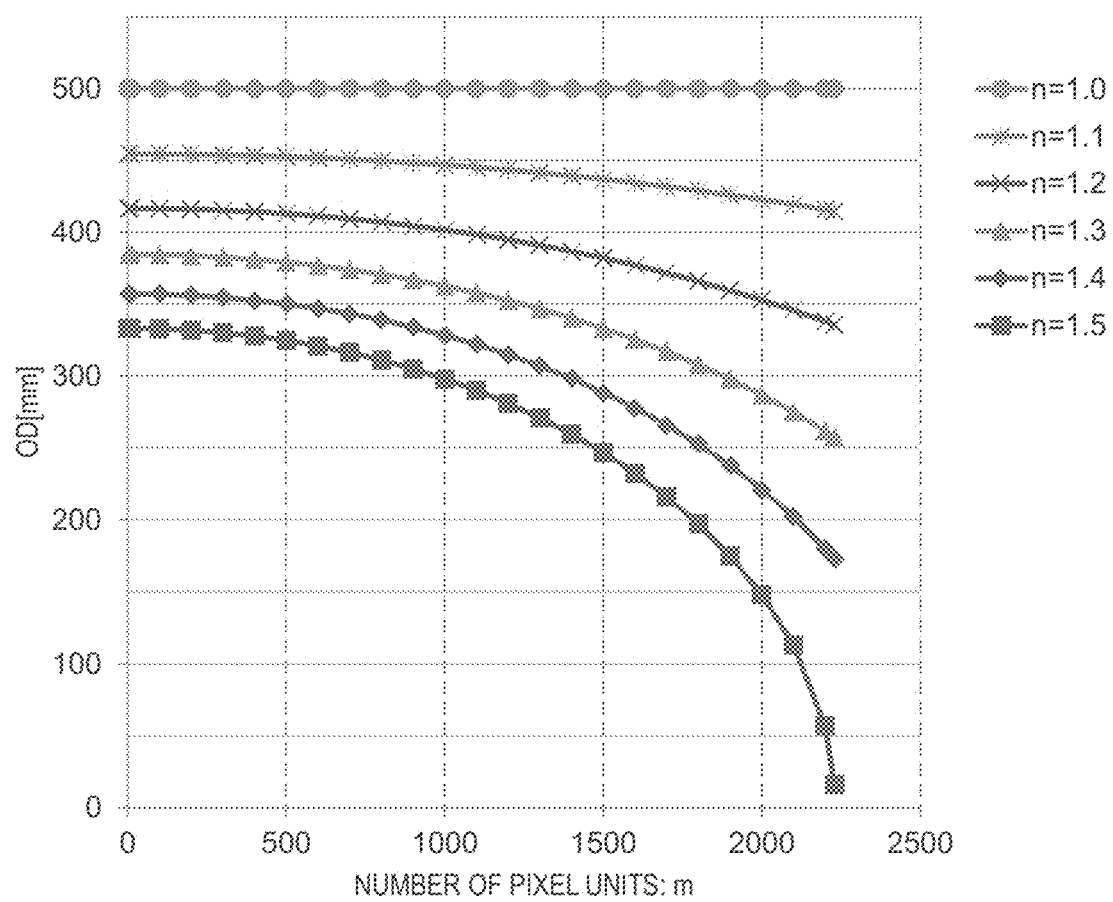
FIG. 22 is a graph illustrating the relationship between a distance OD and a refractive index n and pixel count m.

FIG. 22 is a graph illustrating the relationship between the distance OD and the refractive index n and pixel count m. FIG. 22 illustrates the relationship in the design of table 1.

As illustrated in FIG. 22, if the refractive index n in the 3D-display module 2101 were the same as that of air (n=1), then the distance OD would be 500 mm, regardless of m. However, as the refractive index n increases from 1, the distance OD decreases. Also, if the refractive index n is greater than 1, then as m increases, the distance OD decreases. In other words, it can be understood that depending on the refractive index n and the pixel count m, if the viewer is not at a position closer to the aerial image than the design position of VD=500 mm, then the viewer would not be able to suitably view the 3-dimensional image.

Figure 23A:
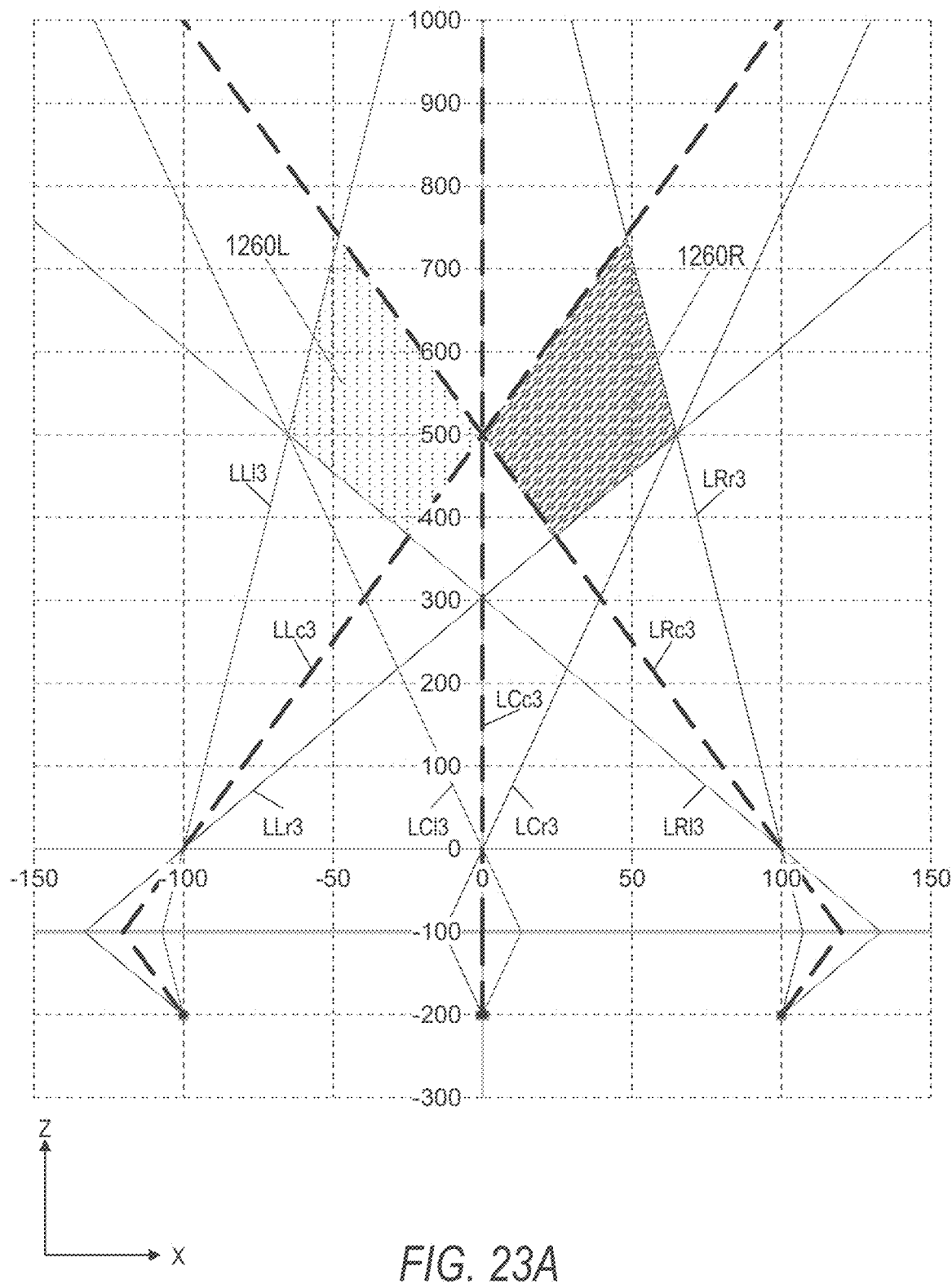
FIGS. 23A, 23B, and 23C are optical diagrams for describing a single view point visibility region of an image display device of given designs.
Figure 23B:
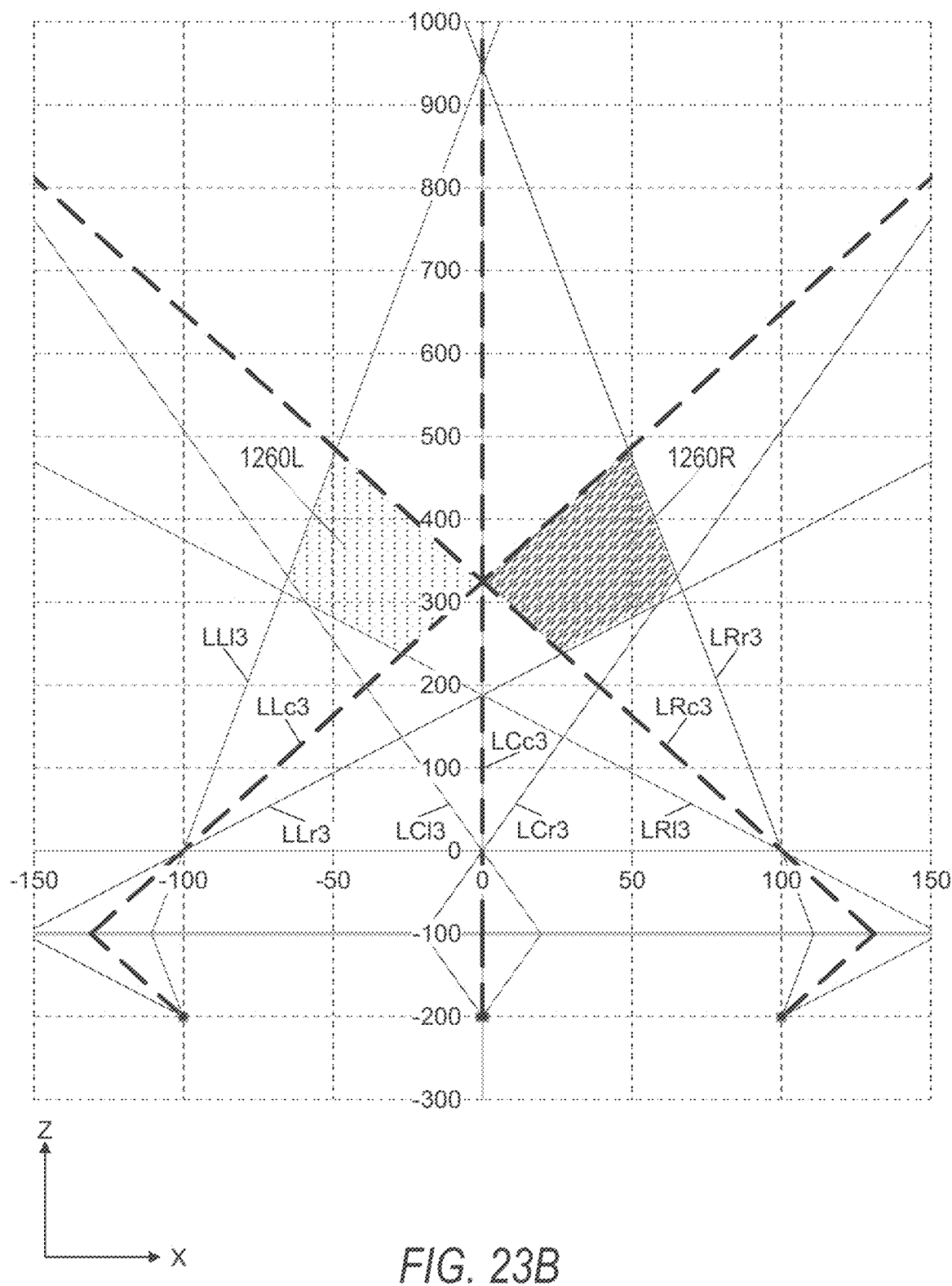
Figure 23C:
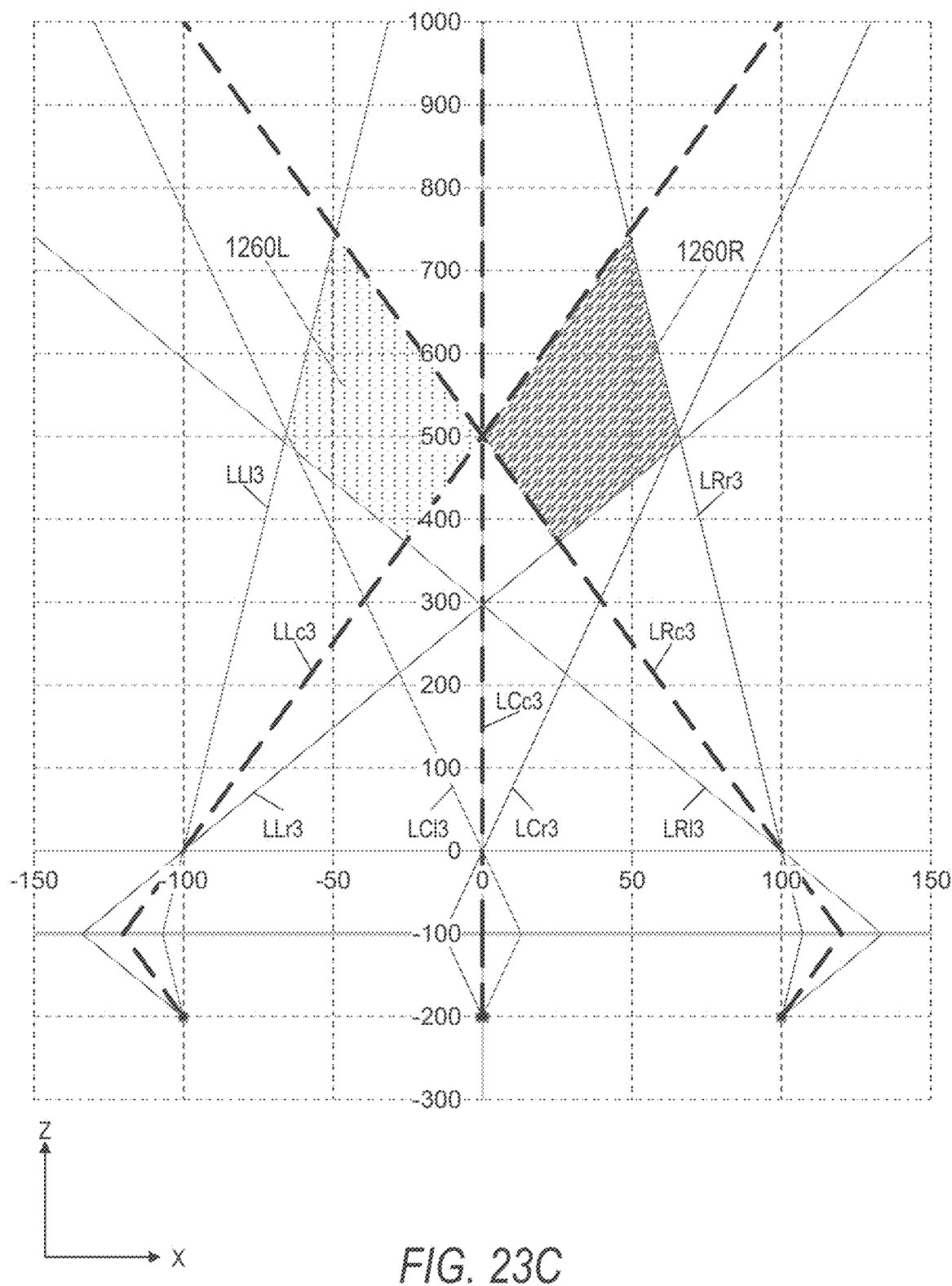

Next, in the design of table 1, a ray diagram for when the pixel count m is 500, and n=1 and n=1.5 is created, and the single view point visibility regions 1260L and 1260R are considered. FIGS. 23A, 23B, and 23C are optical diagrams for describing the single view point visibility regions of the image display device of given designs.

In FIG. 23A, with m=500, n=1, and other values being the design values of table 1, the light beams illustrated in FIG. 19 are drawn by computation.

The vertical axis represents the Z axis direction, the unit is mm, and 0 is the position of the aerial image, and the optical element 2102 (plane S of aerial imaging element 102 of the present disclosure) is arranged at a position of −100 mm. The horizontal axis represents the X direction, the unit is mm, and 0 is the center of the 3D-display module 2101.

In FIG. 23A, the light beams LLc3 and LRc3 intersect at Z=500 mm, and the single view point visibility regions 1260L and 1260R are formed by the light beams. Thus, the viewer can view the 3-dimensional image from a distance of 500 mm as designed.

In FIG. 23B, with m=500, n=1.5, and other values being the design values of table 1, the light beams illustrated in FIG. 19 are drawn by computation.

In this case, the intersection between the light beams LLc3 and LRc3 is at Z=324.87 mm. As illustrated in FIG. 23B, the single view point visibility region 1260L surrounded by the light beams LLl3, LLc3, LCl3, LRl3, and LRc3, and the single view point visibility region 1260R surrounded by the light beams LLr3, LLc3, LCr3, LRr3, and LRc3 are formed in a space closer than Z=500 mm (towards the aerial image).

Thus, the viewer cannot suitably view the 3-dimensional image at a distance of 500 mm from the aerial image. Neither eye is positioned in the single view point visibility regions 1260L and 1260R, and thus, as described in FIGS. 14 and 15, it is not possible to view a desired 3-dimensional image at the edges of the screen. Thus, in order for the viewer to see the desired 3-dimensional image, the viewer must move to a position closer than the design value of VD=500, and preferably 324.87 mm.

The design of the 3D-display module 2101 disclosed in JP 2017-10014 A illustrated in table 1 is compared here with the design of the 3-dimensional display 101 (FIG. 19) of the present disclosure.

The distance VD is the distance OD of the present disclosure, and the distance OD is set to 500 mm. Also, if the pitch Pv, which is 0.2 mm in JP 2017-10014 A, is matched with the pitch P of the present disclosure, it would be set to 0.1 mm. If n=1.5 and the expanded projection width e is set to 65 mm, then the distance h corresponding to d1 is calculated as 1.16 mm according to formulas (8) to (10). When m=500 is added to these values and the pitch Sp of the parallax barrier 130 is calculated using formulas (1) to (5), a value of 0.200306 mm is attained. Table 2 compiles these design values.

TABLE 2

| Design item | Reference character | Design value |
| --- | --- | --- |
| Distance from aerial image to viewing position | OD | 500 mm |
| Number of view points | N | 2 |
| Width of view point pixels | P | 0.1 mm |
| Expanded projection width of view point pixels | e | 65 mm |
| Refractive index in 3-dimensional display | n | 1.5 |
| Distance between parallax barrier and view point pixels | h | 1.16 mm |
| Number of pixel units from center to edge of display panel | m | 500 |
| Pitch of slits of parallax barrier | Sp | 0.200306 mm |

In FIG. 23C, the design values of table 2 are used to draw the light beams illustrated in FIG. 19 by computation.

As illustrated in FIG. 23C, the light beams LLc3 and LRc3 intersect at Z=500 mm, and the single view point visibility regions 1260L and 1260R are formed by the light beams. Thus, the viewer can view the desired 3-dimensional image from a distance of 500 mm as designed. In other words, it can be seen that the image display device 100 can be provided as designed by using the computation formulas of the present disclosure.

According to Embodiment 1, it is possible to design an image display device 100 by which a suitable 3-dimensional image can be viewed.

Figure 31:
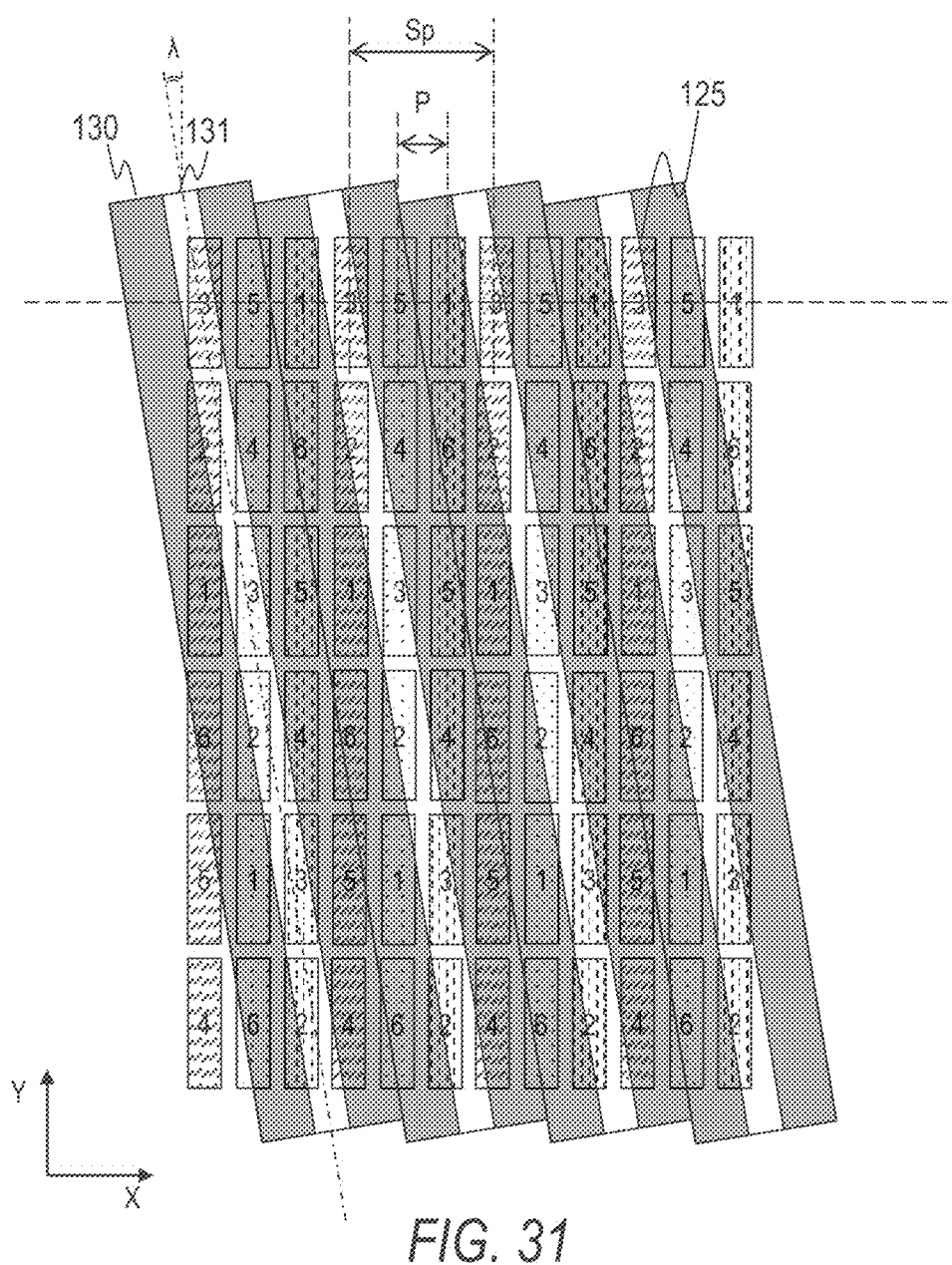
FIG. 31 is a schematic view (XY plan view) for describing the parallax barrier included in the 3-dimensional display of the present disclosure.

In the present invention, the 3-dimensional display illustrated in FIG. 31 can be used instead of the 3-dimensional display using a parallax barrier 130 that is parallel to the arrangement direction (Y axis direction) for the view point pixels in the extension direction of the slits 131 illustrated in FIG. 3.

FIG. 31 illustrates an example of a 3-dimensional display in which the extension direction of the slits 131 of the parallax barrier 130 that functions as the distribution units is set at an angle A in relation to the arrangement direction (Y axis direction) of the view point pixels. By arranging the slits to be inclined in relation to the arrangement of the view point pixels as illustrated in FIG. 31, it is possible not only to distribute the light beams from the view point pixels arranged in the X direction as illustrated in FIG. 3 but also to distribute light beams of view point pixels arranged in the Y direction in a different direction. In other words, the pixel units include not only X direction view point pixels but also Y direction view point pixels. In FIG. 31, a view point image can be displayed in six directions, and the number indicated on each of the view point pixels 125 is the number of the view point image.

If the 3-dimensional display illustrated in FIG. 31 is used in the present invention, then with the slit pitch in the X direction as Sp, the pitch of the view point pixels 125 as P, the number of view points handled by the distribution unit in the X direction as N (N=3 in FIG. 31), and the number of pixel units from the center to the edge in the X direction as m, these values can be plugged into formulas (2), (11), and (12), and as previously described, the pitch Sp can be calculated. As described above, if the distribution unit is arranged at an incline with respect to the view point pixels, then the number of view points N in the X direction of the pixel unit is not limited to being an integer.

Embodiment 2

Figure 24:
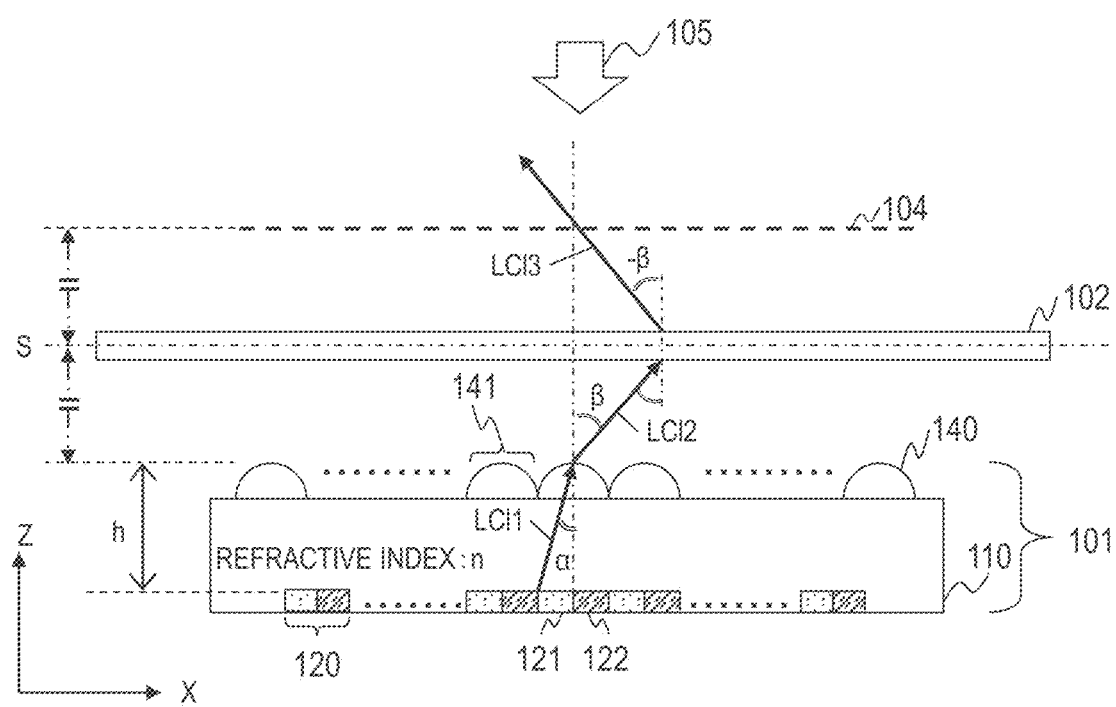
FIG. 24 is a schematic view of an optical model of the image display device of the present disclosure.

In Embodiment 2, the configuration of the 3-dimensional display 101 differs. FIG. 24 is a schematic view of an optical model of the image display device 100 of the present disclosure. FIG. 24 is a view of the cross-sectional structure along the line A-A' on the XZ plane and an optical model. FIG. 24 corresponds to FIG. 2 described in Embodiment 1.

The 3-dimensional display 101 of Embodiment 2 is a 3-dimensional display 101 that uses a lenticular lens as the optical separation means. The 3-dimensional display 101 has the display panel 110 and a lenticular lens 140.

Figure 25:
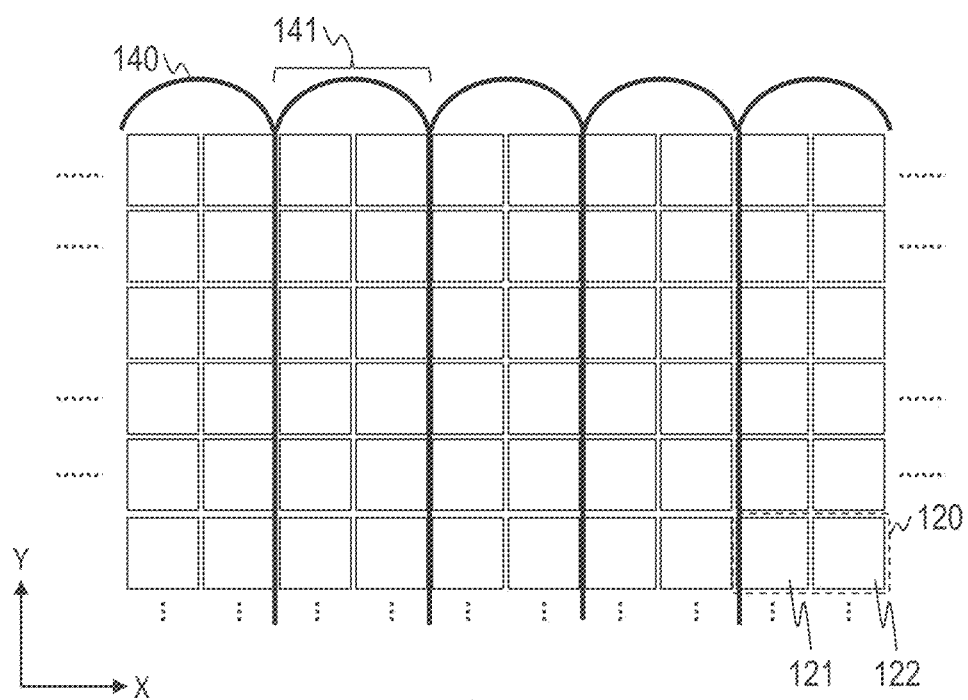
FIG. 25 is a schematic view (XY plan view) for describing a lenticular lens included in the 3-dimensional display of the present disclosure.

The lenticular lens 140 has cylindrical lenses 141 arranged in a uniform pattern. FIG. 25 is a schematic view (XY plan view) for describing the lenticular lens 140 in the center of the 3-dimensional display 101 of the present disclosure.

The refractive index and curvature radius of the cylindrical lenses 141 are set such that the focal length thereof is substantially equal to the distance h from the vertex of the cylindrical lens 141 to the view point pixel. For ease of explanation, the refractive index of the cylindrical lenses 141 is assumed to be equal to the refractive index in the 3-dimensional display 101.

The focal length of the cylindrical lenses 141 is substantially equal to the distance h, and thus, light emitted isotropically from the view point pixels 121 and 122 becomes parallel light as it passes through the cylindrical lenses 141. Thus, by suitably arranging the lenticular lens 140 in the display panel 110, a region where only specific view point pixels 121 and 122 (view point pixel group) can be seen through the cylindrical lenses 141 is formed. In other words, the lenticular lens 140 functions as an optical separation means (division unit) that divides a group of light beams emitted from the display image displayed in the display panel 110 into light beam groups for each view point image. The cylindrical lenses 141 are arranged such that each cylindrical lens 141 corresponds to one pixel unit 120.

A liquid crystal lens in which the lens can be electrically switched ON/OFF can be used as the lenticular lens 140. In such a case, by switching OFF the lens, 2-dimensional images, in addition to the 3-dimensional images, can be displayed.

As described above, the lenticular lens 140 of the present embodiment functions as the optical separation means, similar to the parallax barrier 130 of Embodiment 1, and thus, detailed description of FIG. 25 is omitted.

Also, in the present embodiment as well, the display panel 110, which displays display images including two view point images, will be described as an example, but the display panel 110 may display a display image including three or more view point images. In such a case, the pixel units 120 are constituted of a view point pixel group that display pixels of a plurality of view point images.

Figure 26:
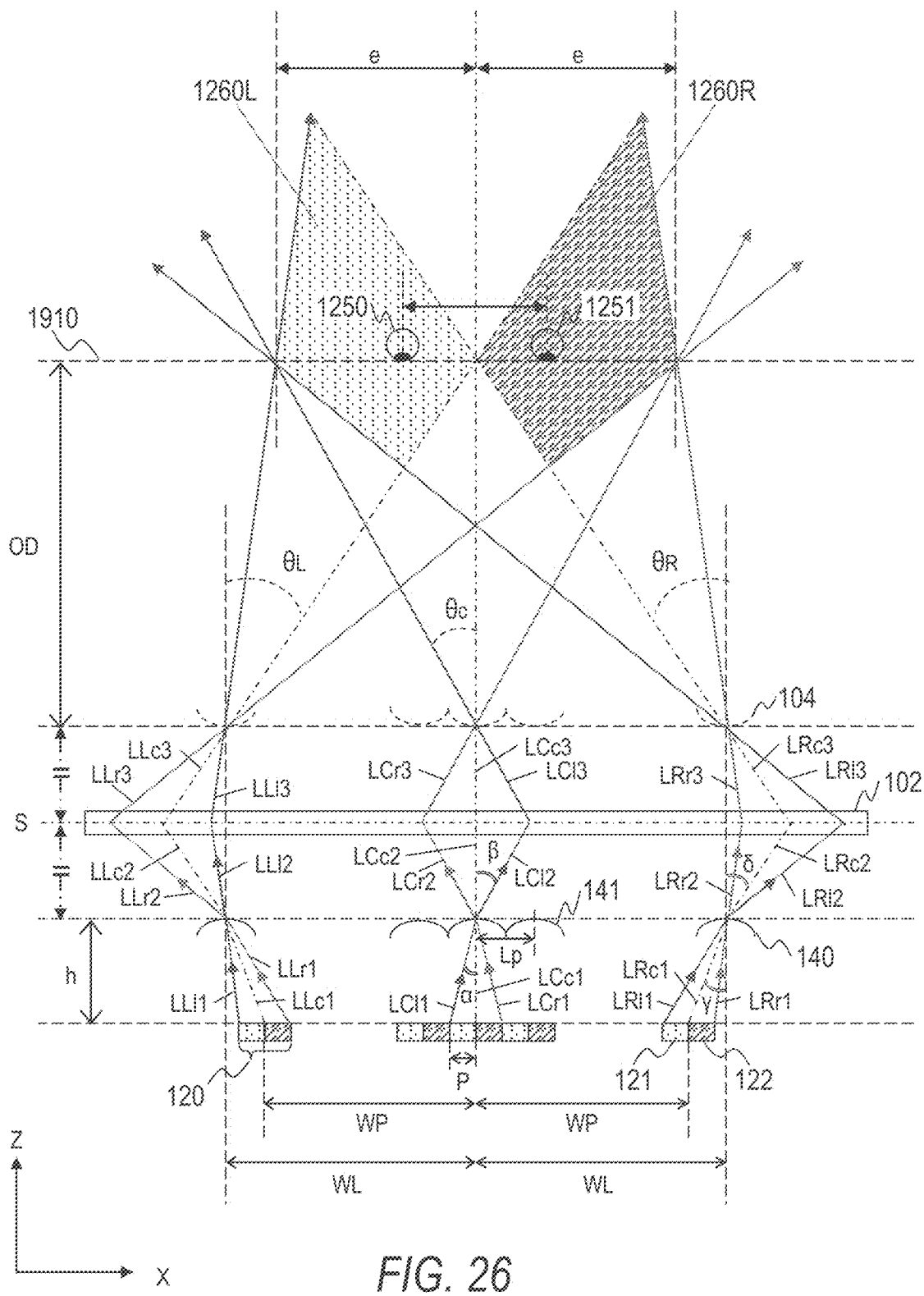
FIG. 26 is a view for describing an example of an optical model of the image display device of the present disclosure.

FIG. 26 is a view for describing an example of an optical model of the image display device 100 of the present disclosure.

The optical model of the image display device 100 illustrated in FIG. 26 is an optical model in which the parallax barrier 130 of the image display device 100 illustrated in FIG. 19 is replaced with a lenticular lens 140, and the slits 131 are replaced by the cylindrical lenses 141.

The interval of the cylindrical lenses 141 corresponding to the pitch Sp representing the interval of the slits 131 in FIG. 19 is designated as the pitch Lp, and the distance from the cylindrical lens 141 in the center of the lenticular lens 140 to the cylindrical lens 141 on the edge corresponding to the distance WS from the slit 131 in the center of the parallax barrier 130 of FIG. 19 to the slit 131 on the edge is designated as the pitch WL. The distance h represents the distance from the vertex of the cylindrical lens 141 to the view point pixels 121 and 122. Other reference characters and components are the same FIG. 19, and thus, descriptions thereof will be omitted.

The 3-dimensional display 101 of Embodiment 2, similar to that of Embodiment 1, is designed such that, in order to form the single view point visibility regions 1260L and 1260R, light beams emitted from the centers of the pixel units 120 on both ends of the screen and passing through the cylindrical lenses 141 on both ends undergo a change in directivity as a result of the aerial imaging element 102 and then intersect each other at the distance OD from the aerial image 104. Thus, where the number of pixel units 120 from the center to the edge in the X direction of the display panel 110 is the pixel count m, the following formulas (23) to (27) are derived, similar to the relationship between formulas (1) to (5).

$$WL = OD \cdot \tan\delta \quad (23)$$

$$WL = m \cdot Lp \quad (24)$$

$$n \cdot \sin\gamma = \sin\delta \quad (25)$$

$$\tan\gamma = \frac{WL - WP}{h} \quad (26)$$

$$WP = 2 \cdot m \cdot P \quad (27)$$

Also, by determining the pitch P, the distance OD, the distance h, and the refractive index n using formulas (8) to (10), the width e can be set to a desired value. By plugging in the values of the parameters for which the width e was set into formulas (23) to (26), the pitch Lp of the cylindrical lenses 141 can be calculated.

The relationship between formulas (1) to (5) and formulas (21) to (25) is that WS is replaced with WL and Sp is replaced with Lp. Thus, the width necessary for the aerial imaging element 102 in the image display device 100 of Embodiment 2 can be calculated by calculating the width WI by plugging WL into WS and Lp into Sp in formula (19) or (21).

If there are N view point pixels in the X direction of the pixel unit 120, then the width WP defined in formula (11) should be used instead of the width WP defined in formula (27). Also, in setting the width e, the angle α should be calculated according to the half value of the pitch (NT) of the pixel unit 120 and the distance h. In other words, formula (12) would be used instead of formula (10).

The image display device 100 of Embodiment 2 designed as described above exhibits similar effects to those of Embodiment 1. Furthermore, the lenticular lens 140 used as the optical separation means of the 3-dimensional display 101 has a higher usage efficiency for light compared to the parallax barrier 130, and thus, it is possible to provide a brighter image or enable lower power consumption compared to the image display device 100 of Embodiment 1.

Figure 32:
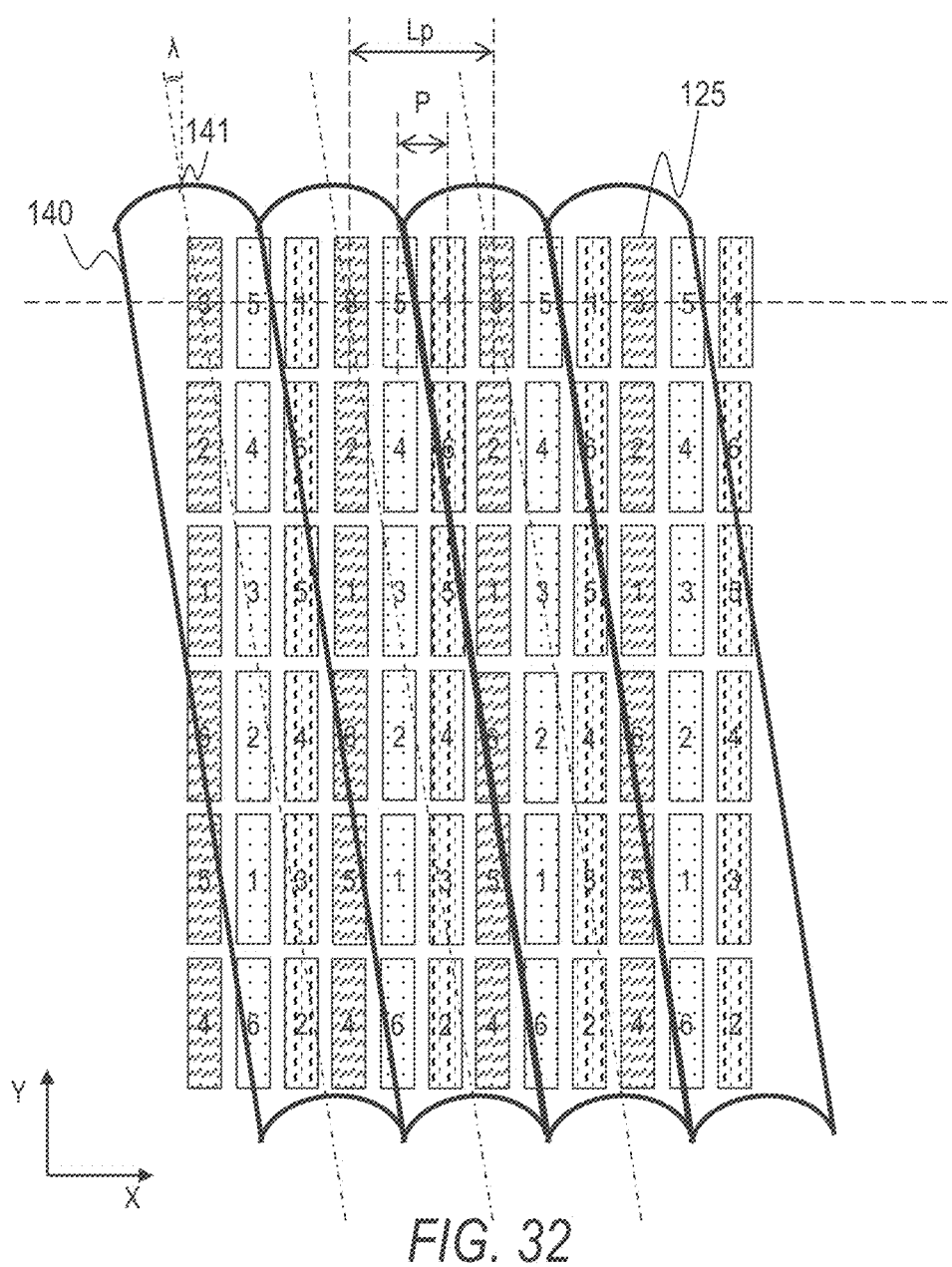
FIG. 32 is a schematic view (XY plan view) for describing the lenticular lens included in the 3-dimensional display of the present disclosure.

In the present invention, the 3-dimensional display illustrated in FIG. 32 can be used instead of the 3-dimensional display using a lenticular lens 140 that is parallel to the arrangement direction (Y axis direction) for the view point pixels in the extension direction of the cylindrical lenses 141 illustrated in FIG. 25.

FIG. 32 illustrates an example of a 3-dimensional display in which the extension direction of the cylindrical lenses 141 that function as the distribution units is set at an angle A in relation to the arrangement direction (Y axis direction) of the view point pixels. By arranging the cylindrical lenses to be inclined in relation to the arrangement of the view point pixels as illustrated in FIG. 32, it is possible not only to distribute the light beams from the view point pixels arranged in the X direction as illustrated in FIG. 25 but also to distribute light beams of view point pixels arranged in the Y direction in a different direction. In other words, the pixel units include not only X direction view point pixels but also Y direction view point pixels. In FIG. 32, a view point image can be displayed in six directions, and the number indicated on each of the view point pixels 125 is the number of the view point image.

If the 3-dimensional display illustrated in FIG. 32 is used in the present invention, then with the pitch of the cylindrical lenses 141 in the X direction as the pitch Lp, the pitch of the view point pixels 125 as P, the number of view points handled by the distribution unit in the X direction as N (N=3 in FIG. 32), and the number of pixel units from the center to the edge in the X direction as m, these values can be plugged into formulas (24), (11), and (12), and as previously described, the pitch Lp can be calculated. As described above, if the distribution unit is arranged at an incline with respect to the view point pixels, then the number of view points N in the X direction of the pixel unit is not limited to being an integer.

Embodiment 3

In Embodiment 3, the configuration of the 3-dimensional display 101 differs. In Embodiments 1 and 2, the parallax barrier 130 and the lenticular lens 140, which function as the optical separation means, are arranged on the aerial imaging element 102 side of the display panel 110. However, in Embodiment 3, the optical separation means is arranged on the side of the display panel 110 opposite to the aerial imaging element 102.

Figure 27:
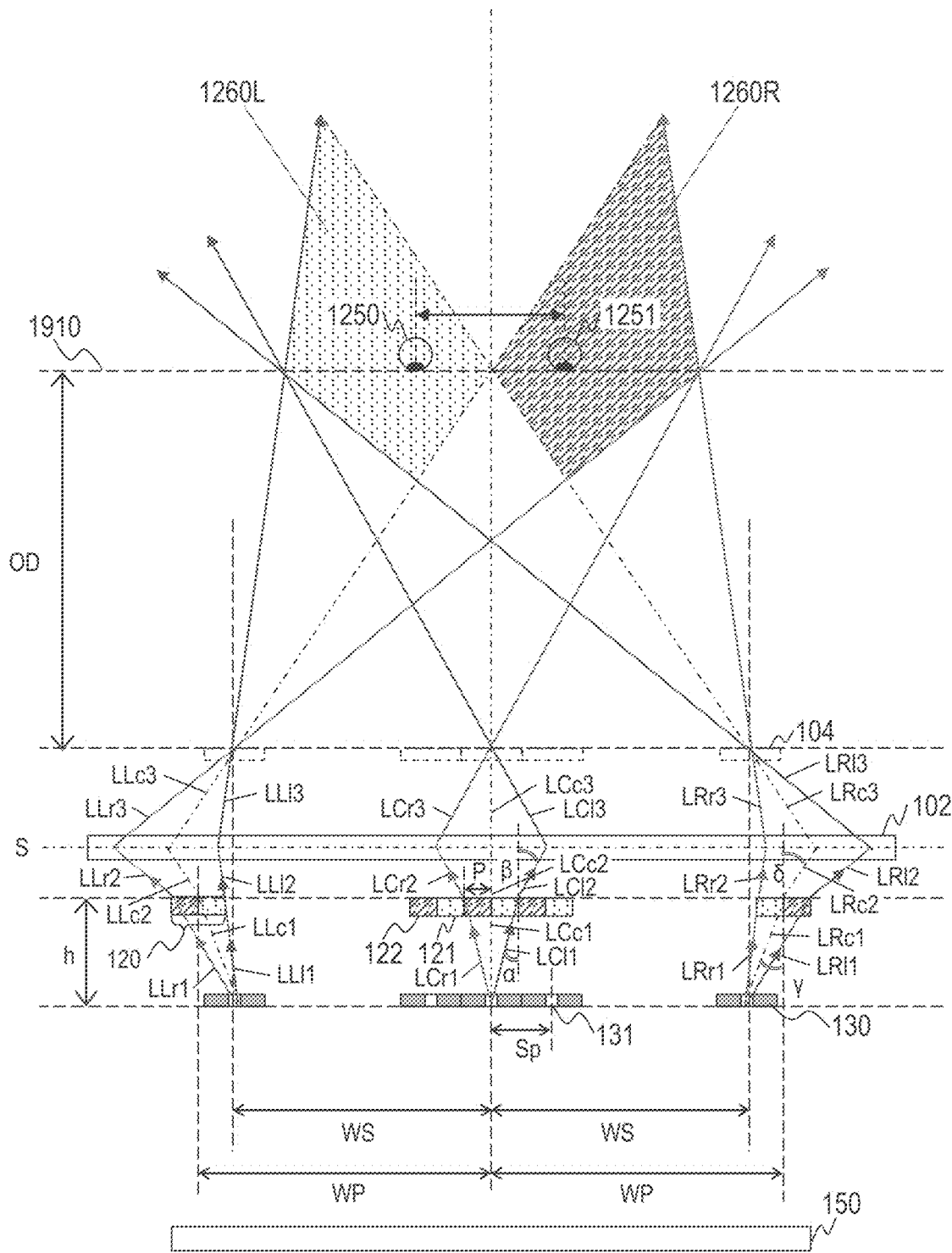
FIG. 27 is a view for describing an example of an optical model of the image display device of the present disclosure.

FIG. 27 is a view for describing an example of an optical model of the image display device 100 of the present disclosure.

In the image display device 100 of the present embodiment, the parallax barrier 130 is arranged on the side of the display panel 110 opposite to the aerial imaging element 102. Also, the image display device 100 further has a projector 150 which is arranged on the parallax barrier 130 side of the 3-dimensional display 101.

Below, characteristics of the image display device 100 in which the light beams heading to the viewer from the aerial image 104 form the single view point visibility regions 1260L and 1260R will be described, but descriptions of components with the same reference characters as Embodiment 1 will be omitted.

As illustrated in FIG. 27, formula (28) holds according to the condition that the light beams LLc3 and LRc3 intersect at the distance OD.

$$WS = OD \cdot \tan\delta \quad (28)$$

With respect to the width WS in formula (28), formula (29) holds according to the pitch Sp and the pixel count m.

$$WS = m \cdot Sp \quad (29)$$

Formula (30) holds according to the refractive index n in the 3-dimensional display 101 and Snell's law.

$$n \cdot \sin\gamma = \sin\delta \quad (30)$$

Also, with respect to the angle γ, formula (31) holds according to the geometric relationship between the distance h illustrated in FIG. 27, the width WS, and the width WP.

$$\tan\gamma = \frac{WP - WS}{h} \quad (31)$$

With respect to the width WP, formula (32) holds according to the number of view points, which is 2, the pitch P of the view point pixels, and the pixel count m of pixel units from the center to the edge.

$$WP = 2 \cdot m \cdot P \quad (32)$$

Also, by determining the pitch P, the distance OD, the distance h, and the refractive index n using formulas (8) to (10), the width e can be set to a desired value. By plugging in the values of the parameters for which the width e was set into formulas (28) to (32), the pitch Sp of the slits 131 can be calculated.

If there are N view point pixels in the X direction of the pixel unit 120, then the width WP defined in formula (11) should be used instead of the width WP defined in formula (32). Also, in setting the width e, the angle α should be calculated according to the half value of the pitch (NT) of the pixel unit 120 and the distance h. In other words, formula (12) would be used instead of formula (10).

Additionally, as described in Embodiment 1 with reference to FIG. 31, it is possible to use a structure in which the extension direction of the slits 131 of the parallax barrier 130 is set at an angle A in relation to the arrangement direction (Y axis direction) of the view point pixels.

The image display device 100 of Embodiment 3 designed as described above exhibits similar effects to those of the image display device 100 of Embodiment 1.

Embodiment 4

In Embodiment 4, the configuration of the 3-dimensional display 101 differs. In Embodiment 4, a lenticular lens 140 is used instead of the parallax barrier 130, which was used as the optical separation means of the image display device 100 described in Embodiment 3.

Figure 28:
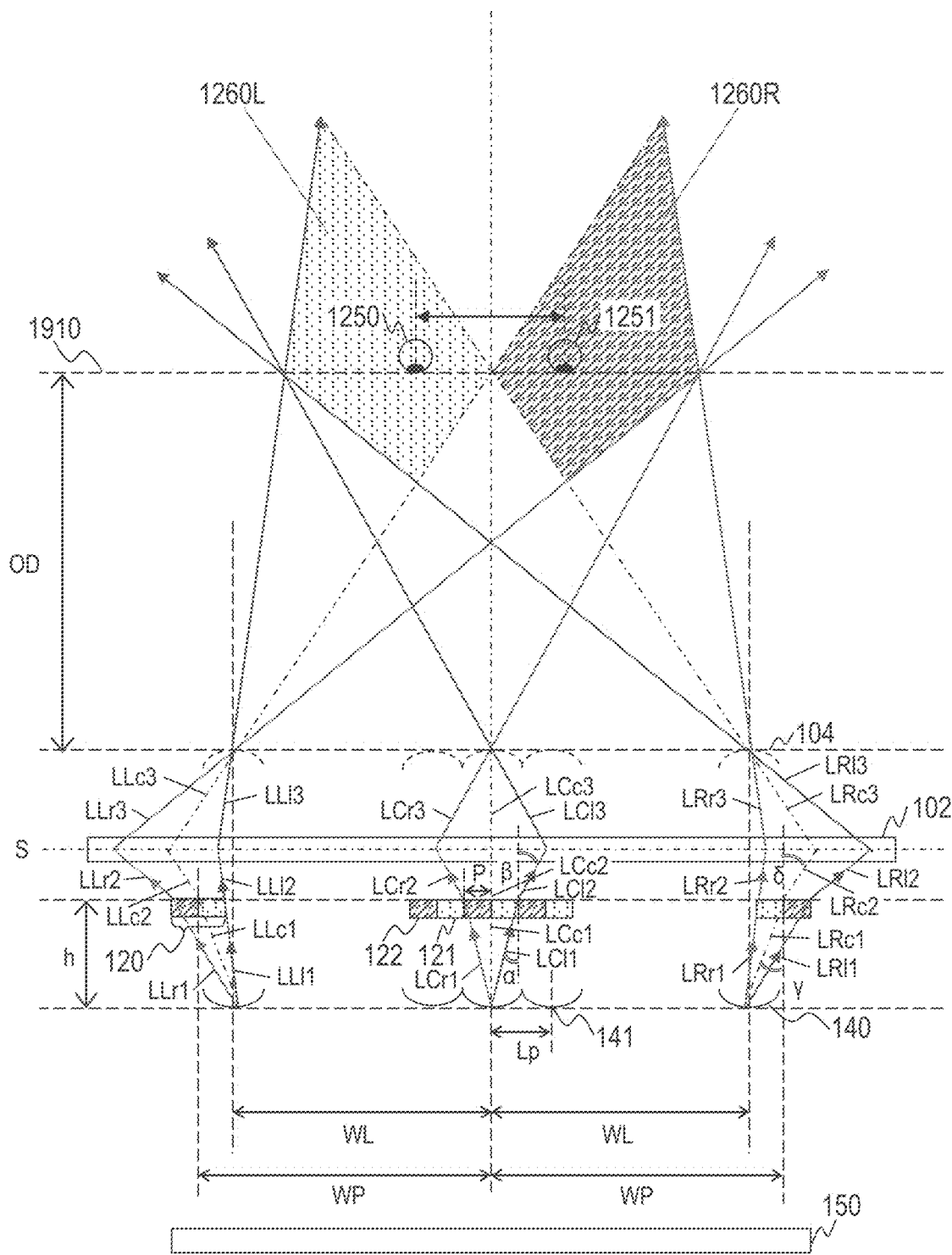
FIG. 28 is a view for describing an example of an optical model of the image display device of the present disclosure.

FIG. 28 is a view for describing an example of an optical model of the image display device 100 of the present disclosure.

Similar to the description of Embodiment 2, if a lenticular lens 140 is used instead of the parallax barrier 130, then the parameters are calculated with WS being replaced with WL and Sp being replaced with Lp. Thus, by plugging WL into WS and Lp into Sp in formulas (28) to (32), the pitch Lp of the cylindrical lenses 141 can be calculated.

Additionally, as described in Embodiment 1 with reference to FIG. 32, it is possible to use a structure in which the extension direction of the cylindrical lenses 141 is set at an angle A in relation to the arrangement direction (Y axis direction) of the view point pixels.

The image display device 100 of Embodiment 4 designed as described above exhibits similar effects to those of the image display device 100 of Embodiment 1.

Embodiment 5

In Embodiment 5, the configuration of the 3-dimensional display 101 differs.

Figure 29:
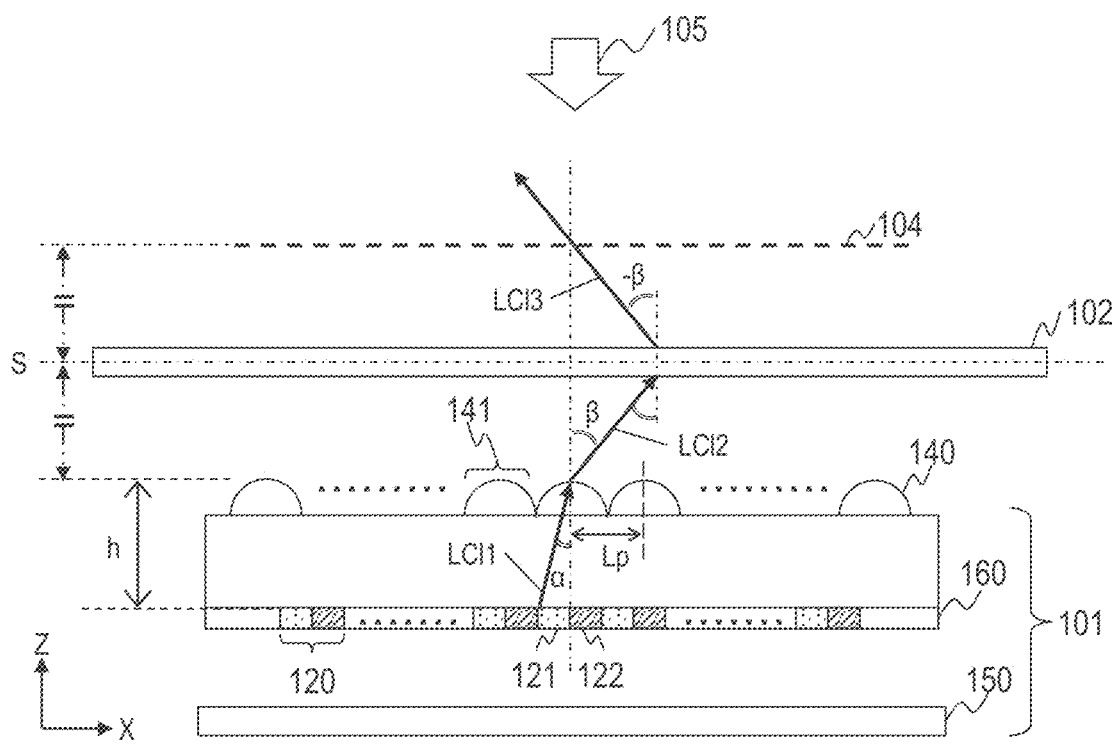
FIGS. 29 and 30 are schematic views of an optical model of the image display device of the present disclosure.
Figure 30:
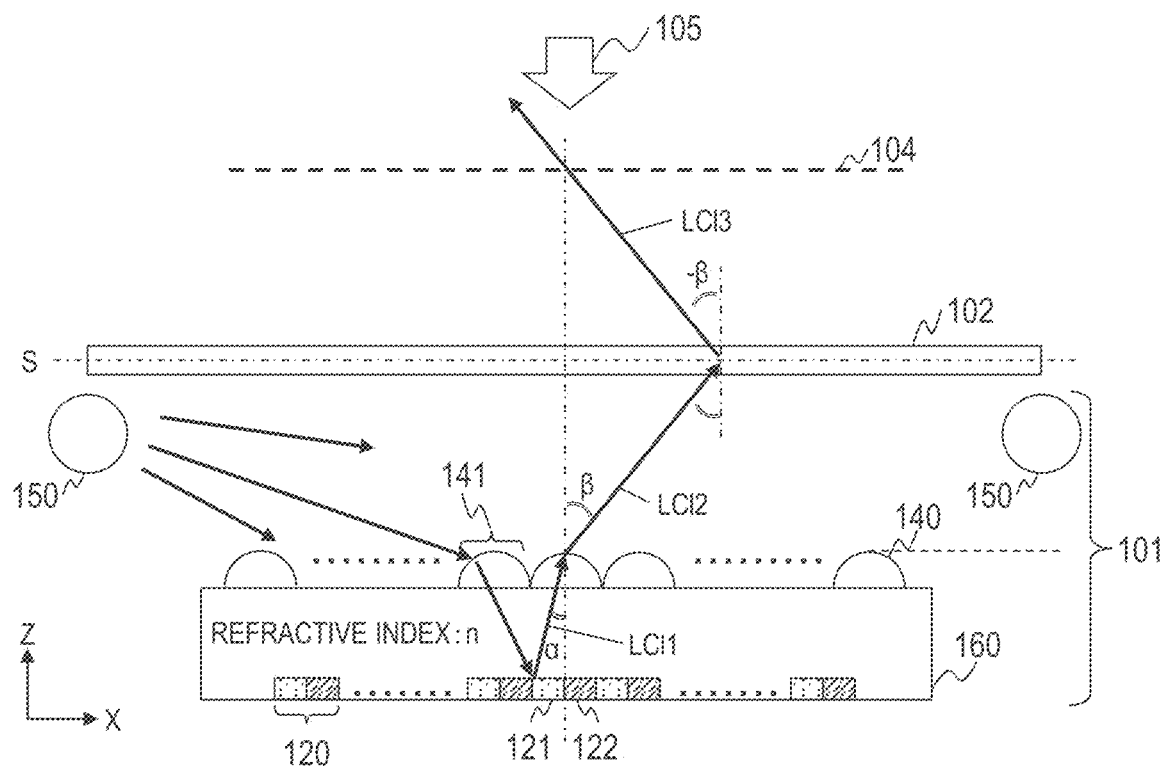

FIGS. 29 and 30 are schematic views of an optical model of the image display device 100 of the present disclosure.

The 3-dimensional display 101 has a projector 150, 3-dimensional printed object 160, and a lenticular lens 140.

The 3-dimensional printed object 160 has printed thereon a plurality of view point images. In the 3-dimensional printed object 160, the plurality of view point images are split into strips, and each strip of the view point image is generated by being arranged into a given pattern. There is no limit to the type of 3-dimensional printed object 160. FIG. 29 illustrates an example in which images from two view points are printed in strips on the rear surface of the lenticular lens 140. If images from more view points are to be displayed, the view point images in the pixel units 120 should be split.

The projector 150 is a device that emits light onto the 3-dimensional printed object 160. The projector 150 is constituted of LED elements, for example. There is no limit to the type of projector 150.

Light emitted from the projector 150 to the 3-dimensional printed object 160 becomes light corresponding to the view point images included in the 3-dimensional printed object 160, and is split by the cylindrical lenses 141.

In FIG. 29, the projector 150 is arranged on the rear surface side of the lenticular lens 140 (towards the 3-dimensional printed object 160), but as illustrated in FIG. 30, the projector 150 may be arranged on the lenticular lens 140 side. The light emitted from the projector 150 enters through the lenticular lens 140, and the light reflected by the printed view point pixels is separated by the cylindrical lenses 141. Although not illustrated, a front light may be used as the projector 150.

The optical model of the image display device 100 of Embodiment 5 is the same as that of Embodiment 2. Thus, the pitch Lp of the cylindrical lenses 141 of the 3-dimensional printed object 160 can be calculated as described below in a manner similar to Embodiment 2.

By determining the pitch P, the distance OD, the distance h, and the refractive index n using formulas (8) to (10), the width e can be set to a desired value, and the values of the parameters for which the width e was set can be used in formulas (23) to (27) to calculate the pitch Lp of the cylindrical lenses 141. Also, the width necessary for the aerial imaging element 102 can be calculated by calculating the width WI by replacing WS with WL and Sp with Lp in formula (19) or (21).

Thus, Embodiment 5 exhibits similar effects to Embodiment 2.

Embodiment 6

The 3-dimensional display, which projects a 3-dimensional image, of the present invention can be used in a multi-display that projects different view point images depending on the viewing position.

Below, an example will be described in which the present invention is applied to a multi-display that projects two different screens according to the viewing position. In describing this, the optical model illustrated in FIG. 19 in which the parallax barrier 130 is arranged on the aerial imaging element 102 side of the display panel 110 is used, but application of the present invention to a multi-display is possible with the configuration using the lenticular lens 140 (optical model illustrated in FIG. 26), the configuration in which the optical separation means is arranged on the side of the display panel 110 opposite to the aerial imaging element 102 (optical models illustrated in FIGS. 27 and 28), and the configuration in which the 3-dimensional printed object 160 is used in the 3-dimensional display (optical models illustrated in FIGS. 29 and 30).

As already described, in the 3-dimensional display, single view point visibility regions 1260L and 1260R are formed, and the 3-dimensional display is designed such that the viewer can view a 3-dimensional image when both eyes are in the prescribed position. In a multi-display, the single view point visibility regions are designed to be large such that different view point images can be seen depending on whether both the left and right eyes of the viewer are located in one single view point visibility region or in the other single view point visibility region. In other words, e is designed to be larger than the gap between the eyes.

Below, an example will be described of a design for the optical model of FIG. 19 in which the expanded projection width e is 300 mm. If the distance OD is 500 mm, the pitch P is 0.1 mm, and n=1.5, then the distance h is calculated as 0.274 mm according to formulas (8) to (10). When m=500 is added to these values and the pitch Sp of the parallax barrier 130 is calculated using formulas (1) to (5), a value of 0.200072 mm is attained. Table 3 compiles these design values.

TABLE 3

| Design item | Reference character | Design value |
|---|---|---|
| Distance from aerial image to viewing position | OD | 500 mm |
| Number of view points | N | 2 |
| Width of view point pixels | P | 0.1 mm |
| Expanded projection width of view point pixels | e | 300 mm |
| Refractive index in 3-dimensional display | n | 1.5 |
| Distance between parallax barrier and view point pixels | h | 0.274 mm |
| Number of pixel units from center to edge of display panel | m | 500 |
| Pitch of slits of parallax barrier | Sp | 0.200072 mm |

Figure 33:
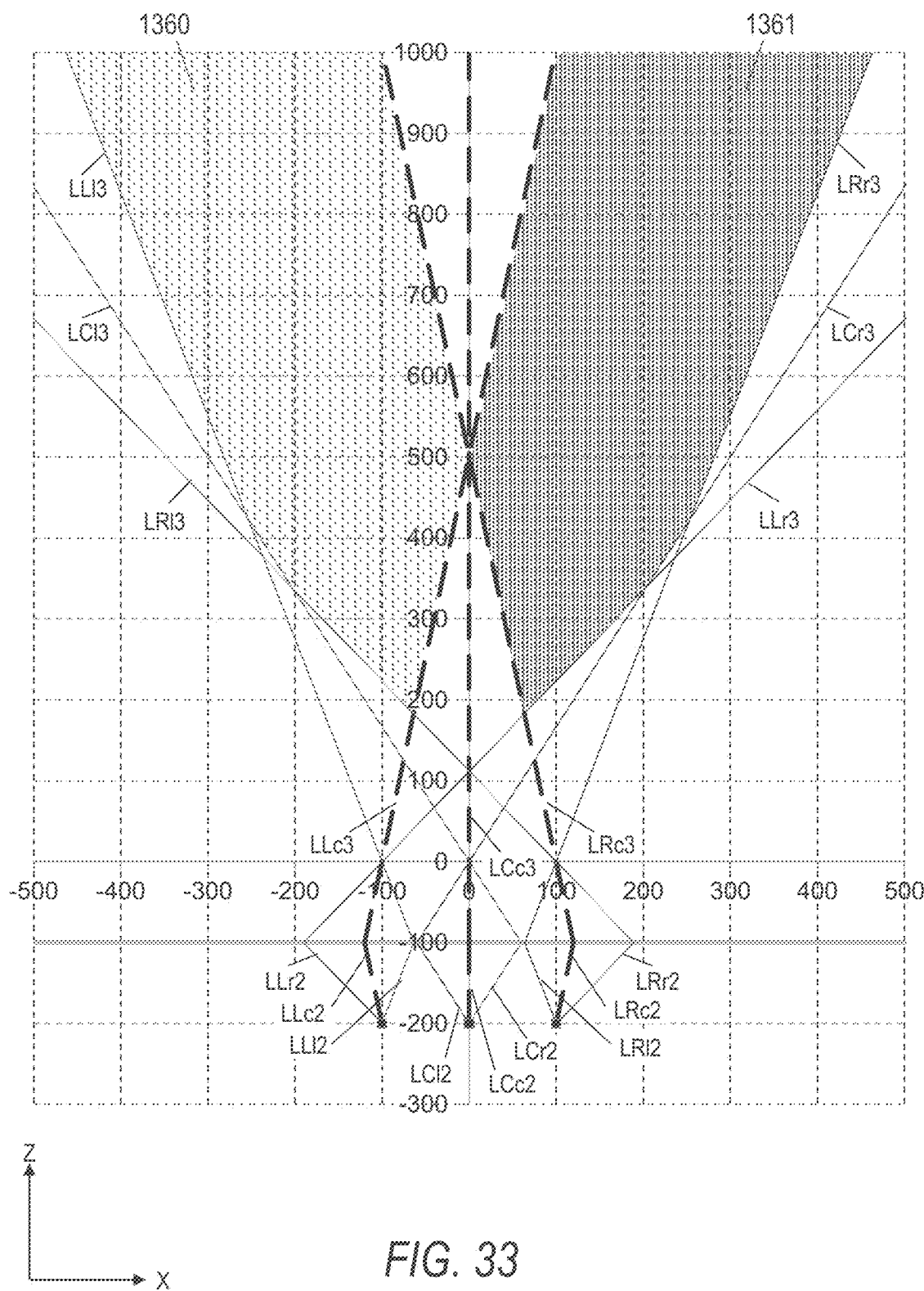
FIG. 33 is a view for describing an example of an optical model of the image display device of the present disclosure.

In FIG. 33, the design values of table 3 are used to draw the light beams illustrated in FIG. 19 by computation. As illustrated in FIG. 33, the light beams LLc3 and LRc3 intersect at Z=500 mm, and the single view point visibility regions 1360 and 1361 are formed by the light beams. The single view point visibility region 1360 is a region where only the view point pixels 121 illustrated in FIG. 19 are visible, and the single view point visibility region 1361 is a region where only the view point pixels 122 illustrated in FIG. 19 are visible.

Figure 34:
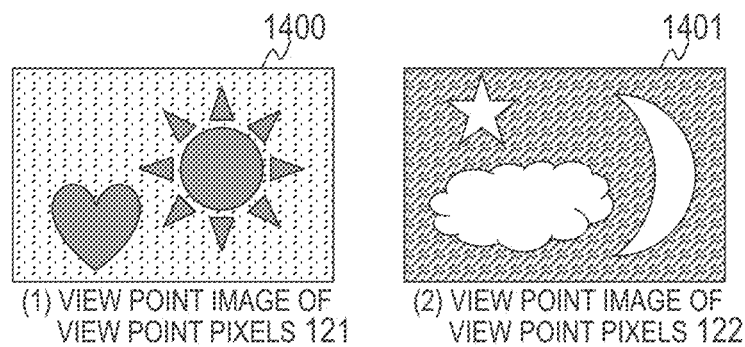
FIG. 34 is a view for describing an example of a view point image of the image display device of the present disclosure.
Figure 35A:
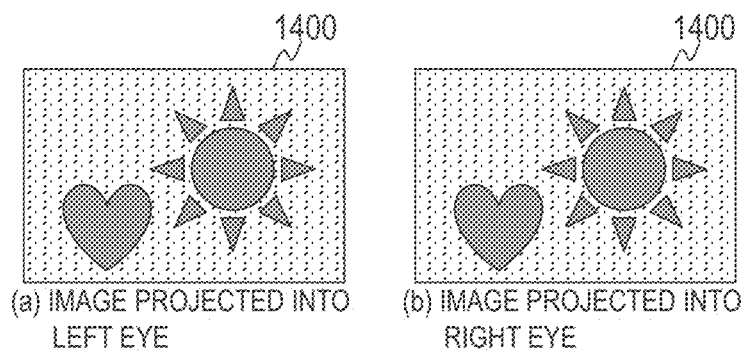
FIGS. 35A and 35B are views for describing an image of both eyes of a viewer who visually recognizes the image display device of the present disclosure.
Figure 35B:
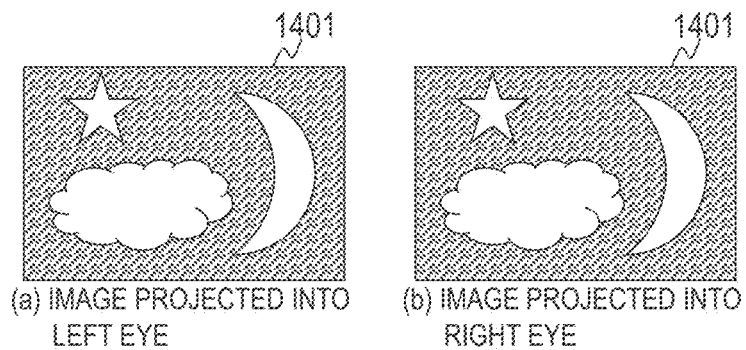

As illustrated in FIG. 34, if the view point image 1400 is displayed in the view point pixels 121 and the view point image 1401 is displayed in the view point pixels 122, then when the viewer's left and right eyes are both located in the single view point visibility region 1360, the viewer sees the view point image 1400 as illustrated in FIG. 35A, and when the viewer's left and right eyes are both located in the single view point visibility region 1361, the viewer sees the view point image 1401 as illustrated in FIG. 35B.

The image display device 100 of the present invention designed as described above can provide a screen constituted of a single view point image that differs depending on the observation position as an aerial image. The width necessary for the aerial imaging element 102 used in the present embodiment can be calculated according to formula (19) or (21).

A case in which the multi-display designed to provide an aerial image as illustrated in FIGS. 35A and 35B is viewed without the aerial imaging element will be described with reference to FIGS. 36 and 37.

Figure 36:
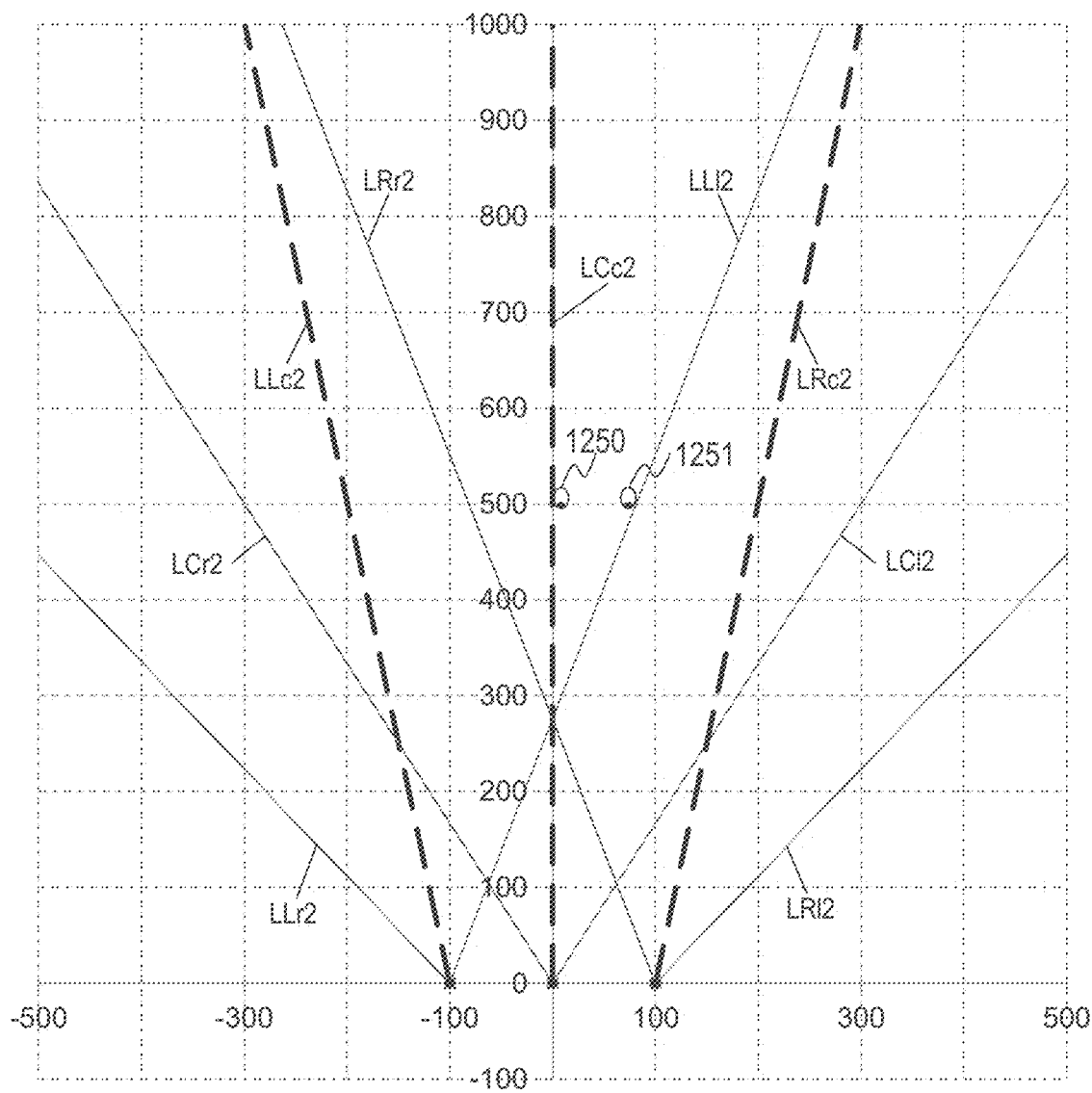
FIG. 36 is a view for describing an example of an optical model of a multi-display of the present disclosure.

FIG. 36 illustrates a case in which there is no aerial imaging element, or in other words, depicts, by calculation in a manner similar to FIG. 33, light beams LLl2, LLc2, LLr2, LCl2, LCc2, LCr2, LRl2, LRc2, and LRr2 from the slits 131 in FIG. 19.

As illustrated in FIG. 36, the light beams LLc2 and LRc2 do not intersect, and no single view point visibility region is formed. Thus, two view point images coexist in the screen seen by the viewer. As an example, the screens seen by the respective eyes of the viewer are illustrated in FIG. 37 for a case in which the left eye 1250 of the viewer is located at X=10 mm and Z=500 mm, and the right eye 1251 is located at X=75 mm and Z=500 mm as illustrated in FIG. 36.

Figure 37:
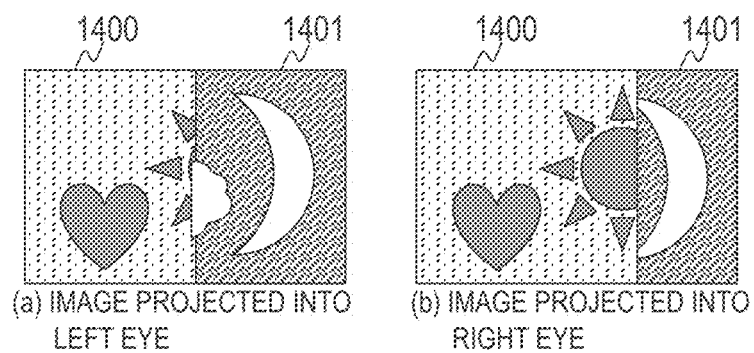
FIG. 37 is a view for describing an image of both eyes of a viewer who visually recognizes the multi-display of the present disclosure.

As illustrated in FIG. 37, the screens projected to each of the eyes include a region of the view point image 1400 and a region of the view point image 1401.

As set forth above, embodiments of this invention have been described; however, this invention is not limited to the foregoing embodiments. Those skilled in the art can easily modify, add, or convert each element in the foregoing embodiment within the scope of this invention. A part of the configuration of one embodiment can be replaced with a configuration of another embodiment or a configuration of an embodiment can be incorporated into a configuration of another embodiment.

What is claimed is:

1. A display device, comprising:
   a projection device that projects a display image including a plurality of view point images with differing view points;
   an aerial imaging element that projects the display image as a real image in midair; and
   a distribution mechanism in which a plurality of distribution units that distribute light from the display image are arranged at a given interval so as to form view point image viewing regions of the plurality of view point images,
   wherein each of the plurality of distribution units is arranged so as to correspond to each pixel unit constituted of a plurality of view point pixels that display the plurality of view point images, and
   wherein an interval (Sp) between the plurality of distribution units is determined according to a relationship between
   a number (N) of the plurality of view point pixels constituting the pixel unit,
   a number (m) of a plurality of pixel units from a center of the projection device to an edge of the projection device,
   a distance (WP) from the pixel unit at the center of the projection device to the pixel unit at the edge of the projection device,
   a distance (WS) from one of the plurality of distribution units corresponding to the pixel unit at the center of the projection device to one of the plurality of distribution units corresponding to the pixel unit at the edge of the projection device,
   a pitch (P) of one of the plurality of view point pixels included in the pixel unit,
   an angle ($\alpha$) of light from the pixel unit at the center of the projection device emitted to one of the plurality of distribution units, and an angle ($\beta$) of the light emitted from the one of the plurality of distribution units, the angle ($\beta$) is different from the angle ($\alpha$),
   an angle ($\gamma$) of light from the pixel unit at the edge of the projection device emitted to one of the plurality of distribution units, and an angle ($\delta$) of the light emitted from the one of the plurality of distribution units, the angle ($\delta$) is different from the angle ($\gamma$),
   a distance (h) between the projection device and the plurality of distribution units,
   a refractive index (n) of the distribution mechanism, the refractive index (n) is greater than 1,
   a distance (OD) between the real image and an optimal viewing position for a viewer, and
   a projection width (e) that is half of the pitch of the pixel unit at the distance (OD) from the real image.

2. The display device according to claim 1,
wherein the interval between the plurality of distribution units is designed such that the projection width (e) is greater than a gap between both eyes of the viewer.

3. The display device according to claim 1,
wherein the distribution mechanism is arranged between the pixel unit and the aerial imaging element, and
wherein the interval (Sp) between the plurality of distribution units is calculated by formulas (1) to (7):

$$WP = N \cdot m \cdot P \tag{1}$$

$$WS = m \cdot Sp \tag{2}$$

$$\tan\alpha = \frac{N \cdot P/2}{h} \tag{3}$$

$$e = OD \cdot \tan\beta \tag{4}$$

$$n \cdot \sin\alpha = \sin\beta \tag{5}$$

$$\tan\gamma = \frac{WS - WP}{h} \tag{6}$$

$$WS = OD \cdot \tan\delta. \tag{7}$$

4. The display device according to claim 3,
wherein the distribution mechanism is either one of a lenticular lens having a plurality of cylindrical lenses as the plurality of distribution units and a parallax barrier having a plurality of slits as the plurality of distribution units.

5. The display device according to claim 4,
wherein an extension direction of each of the plurality of slits of the parallax barrier is at an incline with respect to an arrangement direction of the plurality of view point pixels.

6. The display device according to claim 4,
wherein an extension direction of each of the cylindrical lenses of the lenticular lens is at an incline with respect to an arrangement direction of the plurality of view point pixels.

7. The display device according to claim 3,
wherein a width (WI) from the center to the edge of the aerial imaging element satisfies formula (15):

$$WI \geq WS + Dpi \cdot \tan\left(\arcsin\left(n \cdot \sin\left(\arctan\left(\frac{WS - WP - N \cdot P/2}{h}\right)\right)\right)\right). \tag{15}$$

8. The display device according to claim 3,
wherein the projection device is constituted of a printed object in which the plurality of view point images are printed, and a projector that emits light onto the printed object.

9. The display device according to claim 1,
wherein the pixel unit is arranged between the distribution mechanism and the aerial imaging element, and
wherein the interval (Sp) between the plurality of distribution units is calculated by formulas (8) to (14):

$$WP = N \cdot m \cdot P \tag{8}$$

$$WS = m \cdot Sp \tag{9}$$

$$\tan\alpha = \frac{N \cdot P/2}{h} \tag{10}$$

$$e = OD \cdot \tan\beta \tag{11}$$

$$n \cdot \sin\alpha = \sin\beta \tag{12}$$

$$\tan\gamma = \frac{WP - WS}{h} \tag{13}$$

$$WS = OD \cdot \tan\delta. \tag{14}$$

10. A display device, comprising:
an aerial imaging element that has a plane, and that, according to a subject on one surface side of the plane, forms in midair on another surface side of the plane a real image in which a protrusion/recess relationship is inverted; and
a 3-dimensional display that is constituted of a display panel having a plurality of view point pixels that display a plurality of view point images, and a distribution mechanism that distributes light of the plurality of view point images of the display panel,
wherein the plurality of view point images of the 3-dimensional display are formed in midair by the aerial imaging element,
wherein the distribution mechanism has a refractive index differing from air,
wherein light beams emitted from the plurality of view point pixels and passing through the distribution mechanism are refracted,
wherein the plurality of view point images projected by the 3-dimensional display include a normal view region and a reverse view region in a screen, and
wherein an image formed in midair by the aerial imaging element from the plurality of view point images has a viewing position in which all of the screen is a normal view region.

11. The display device according to claim 10,
wherein an area of the aerial imaging element is greater than a display area of the 3-dimensional display.

12. A display device, comprising:
an aerial imaging element that has a plane, and that, according to a subject on one surface side of the plane, forms in midair on another surface side of the plane a real image in which a protrusion/recess relationship is inverted; and
a multi-display that is constituted of a display panel having a plurality of view point pixels that display a plurality of view point images, and a distribution mechanism that distributes light of the plurality of view point images of the display panel,
wherein the plurality of view point images of the multi-display are formed in midair by the aerial imaging element,
wherein the distribution mechanism has a refractive index differing from air,
wherein light beams emitted from the plurality of view point pixels and passing through the distribution mechanism are refracted,
wherein the plurality of view point images projected by the multi-display include a region of a given view point image in a screen and a region of a view point image differing from the given view point image, and
wherein an image formed in midair by the aerial imaging element from the plurality of view point images has a viewing position in which all of the screen is the given view point image.

13. The display device according to claim 12, wherein an area of the aerial imaging element is greater than a display area of the multi-display.

\* \* \* \* \*